US 12,444,342 B2

United States Patent
Jung et al.

(10) Patent No.: US 12,444,342 B2
(45) Date of Patent: Oct. 14, 2025

(54) DISPLAY DEVICE AND METHOD FOR ADJUSTING POWER CONSUMPTION OF SIGNAL RECEIVER

(71) Applicant: SAMSUNG ELECTRONICS CO., LTD., Suwon-si (KR)

(72) Inventors: Sungbum Jung, Suwon-si (KR); Sungyong Joo, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/772,849

(22) Filed: Jul. 15, 2024

(65) Prior Publication Data

US 2024/0371310 A1    Nov. 7, 2024

Related U.S. Application Data

(63) Continuation of application No. PCT/KR2022/020631, filed on Dec. 16, 2022.

(30) Foreign Application Priority Data

Feb. 17, 2022    (KR) .................. 10-2022-0021093

(51) Int. Cl.
  *G09G 3/20*        (2006.01)
  *H04N 5/63*        (2006.01)

(52) U.S. Cl.
  CPC ..... *G09G 3/2092* (2013.01); *G09G 2330/021* (2013.01)

(58) Field of Classification Search
  CPC .. G09G 3/2092; G09G 2330/021; G09G 3/20; H04N 5/63; H04N 21/422; H04N 21/42204
  See application file for complete search history.

(56) References Cited

U.S. PATENT DOCUMENTS 5,990,646 A * 11/1999 Kovach .................. E06B 9/32
                                                    318/16
8,405,783 B2    3/2013 Taya
(Continued)

FOREIGN PATENT DOCUMENTS

JP    2009-124896 A    6/2009
KR    10-0403096 B1    10/2003
(Continued)

OTHER PUBLICATIONS

International Search Report (PCT/ISA/210) issued on Mar. 20, 2023 by the International Searching Authority in International Application No. PCT/KR2022/020631.
(Continued)

*Primary Examiner* — Antonio Xavier
(74) *Attorney, Agent, or Firm* — Sughrue Mion, PLLC

(57)    ABSTRACT

A display device includes; a signal receiver configured to receive a control signal in form of infrared light, from a remote controller; and a controller configured to: control the signal receiver, based on the control signal received by the signal receiver, control the signal receiver, based on a first state in which the signal receiver is activated according to a preset period smaller than a duration of the control signal; in response to identifying the control signal by the signal receiver that is controlled based on the first state, control the signal receiver, based on a second state in which the signal receiver is activated during a time section longer than the duration of the control signal; and control the display device, based on the control signal identified by the signal receiver.

20 Claims, 12 Drawing Sheets

(56) References Cited

U.S. PATENT DOCUMENTS

| | | | |
|---|---|---|---|
| 8,411,076 | B2 | 4/2013 | Berkay et al. |
| 8,446,051 | B2 | 5/2013 | Luthi et al. |
| 9,444,348 | B2 | 9/2016 | Woo et al. |
| 9,594,422 | B2 | 3/2017 | Baik |
| 10,601,519 | B2 | 3/2020 | Lo |
| 11,722,633 | B2 | 8/2023 | Yoo et al. |
| 2010/0123598 | A1* | 5/2010 | Brodersen .............. G08C 19/28 340/12.19 |
| 2011/0001651 | A1 | 1/2011 | Candelore et al. |
| 2011/0080338 | A1* | 4/2011 | Berkay .................. H02M 3/28 345/156 |
| 2011/0254722 | A1* | 10/2011 | Naiki ..................... G08C 17/02 341/173 |
| 2011/0307725 | A1* | 12/2011 | Wendling ........... H04N 21/6543 713/323 |
| 2012/0201062 | A1 | 8/2012 | Lee |
| 2018/0041731 | A1 | 2/2018 | Yu et al. |

FOREIGN PATENT DOCUMENTS

| | | |
|---|---|---|
| KR | 10-2006-0020558 A | 3/2006 |
| KR | 10-0975642 B1 | 8/2010 |
| KR | 10-2010-0139089 A | 12/2010 |
| KR | 10-2012-0027409 A | 3/2012 |
| KR | 10-1273674 B1 | 6/2013 |
| KR | 10-2014-0025937 A | 3/2014 |
| KR | 10-2015-0074637 A | 7/2015 |
| KR | 10-2016-0056577 A | 5/2016 |
| KR | 10-1775937 B1 | 9/2017 |
| KR | 10-2521933 B1 | 4/2023 |
| WO | 2019/142417 A1 | 7/2019 |

OTHER PUBLICATIONS

Written Opinion (PCT/ISA/237) issued on Mar. 20, 2023 by the International Searching Authority in International Application No. PCT/KR2022/020631.

\* cited by examiner

DISPLAY DEVICE AND METHOD FOR ADJUSTING POWER CONSUMPTION OF SIGNAL RECEIVER

CROSS-REFERENCE TO RELATED APPLICATIONS

This application is a by-pass continuation application of International Application No. PCT/KR2022/020631, filed on Dec. 16, 2022, which is based on and claims priority to Korean Patent Application No. 10-2022-0021093, filed on Feb. 17, 2022, in the Korean Intellectual Property Office, the disclosures of which are incorporated by reference herein their entireties.

BACKGROUND cl 1. Field

The disclosure relates to a display device and a method for adjusting power consumption of a signal receiver.

2. Description of Related Art

Recently, with development of electronic technology, various type of display device is being developed and distributed, and demand for a large display device is increasing. Meanwhile, a function supported by the display device is diversified. As the display device becomes larger and/or as the function of the display device is diversified, power consumption of the display device may increase.

SUMMARY

A method for reducing power consumption of a display device may be required.

A method for reducing power (e.g., standby power) consumed by a display device connected to a power source in another state (e.g., stand-by state, idle state, and/or sleep state) different from an activated state that outputs an image, may be required.

According to an aspect of the disclosure, a display device includes; a signal receiver configured to receive a control signal in form of infrared light, from a remote controller; and a controller configured to: control the signal receiver, based on the control signal received by the signal receiver, control the signal receiver, based on a first state in which the signal receiver is activated according to a preset period smaller than a duration of the control signal; in response to identifying the control signal by the signal receiver that is controlled based on the first state, control the signal receiver, based on a second state in which the signal receiver is activated during a time section longer than the duration of the control signal; and control the display device, based on the control signal identified by the signal receiver.

According to an aspect of the disclosure, a method of a display device includes: controlling a signal receiver configured to receive a control signal in form of infrared light from a remote controller, based on a first state in which the signal receiver is activated according to a preset period smaller than a duration of the control signal; in response to identifying the control signal by the signal receiver that is controlled based on the first state, controlling, based on a second state in which the signal receiver is activated during a time section longer than the duration of the control signal; and controlling the display device, based on the control signal identified by the signal receiver.

The technical aspects to be achieved in this document are not limited to those described above, and other technical aspects not mentioned herein will be clearly understood by those having ordinary knowledge in the art to which the present disclosure belongs, from the following description.

A display device according to an embodiment can reduce power consumption in a stand-by state. The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
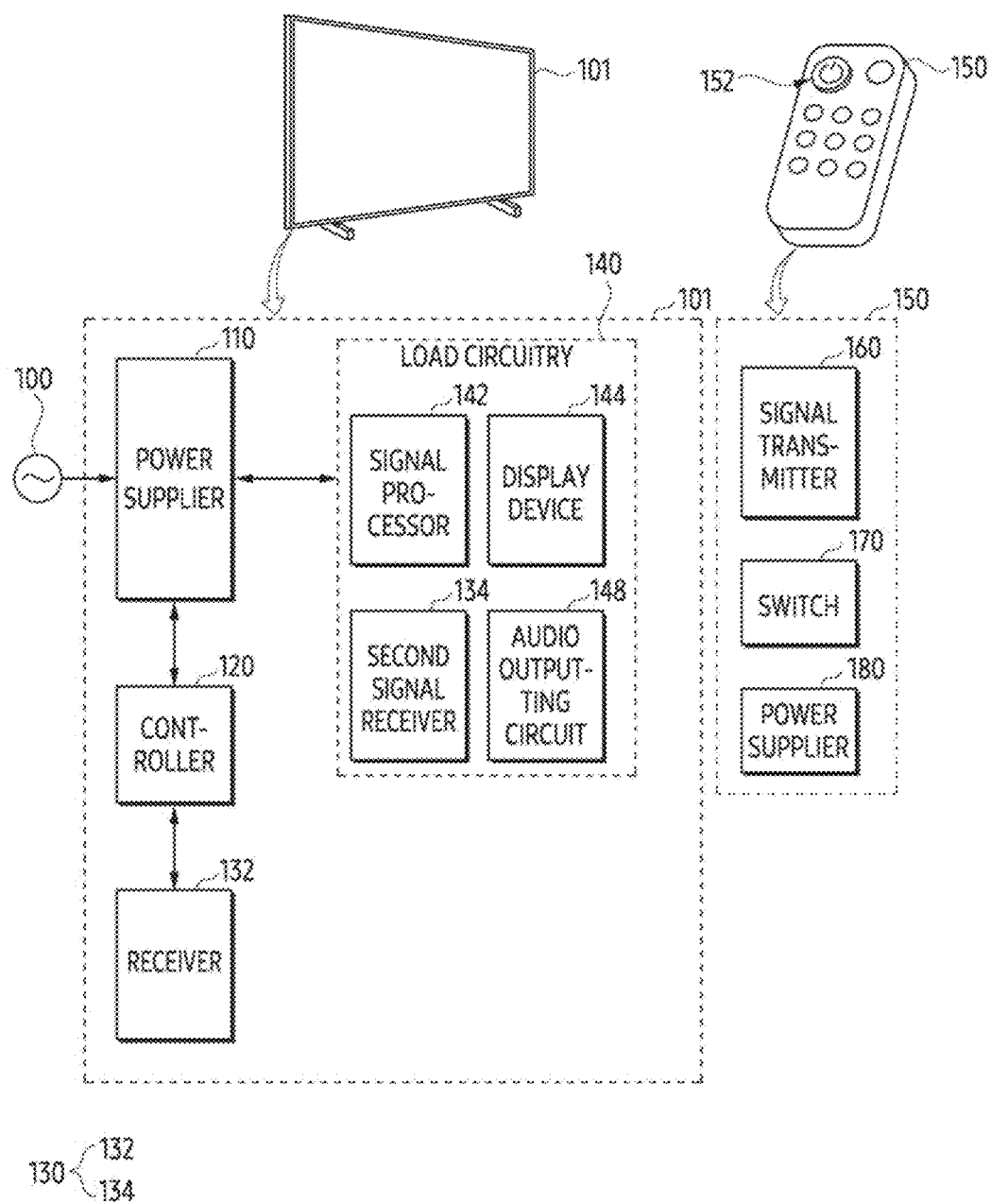
FIG. 1 is a block diagram of a display device and an external electronic device according to an embodiment.

Hereinafter, one or more embodiments of the disclosure will be described with reference to an accompanying drawing.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Before undertaking the detailed description below, it may be advantageous to set forth definitions of certain words and phrases used throughout the disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

A singular expression may include a plural expression unless it is clearly meant differently in the context. Expressions such as "1st", "2nd", "first" or "second", and the like may modify the corresponding components regardless of order or importance, is only used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the disclosure may include a unit configured with hardware, software, or firmware, and may be used interchangeably with terms such as logic, logic block, component, or circuit, and the like, for example. The module may be an integrally configured component or a minimum unit or part thereof that performs one or more functions. For example, a module may be configured with an application-specific integrated circuit (ASIC).

FIG. 1 is a block diagram of a display device 101 and an external electronic device 150 according to an embodiment. The display device 101 may be an electronic device capable of displaying an image. For example, the display device 101 may include a television (TV), a monitor, a computer, a smartphone, a tablet, a portable media player, a wearable device, a video wall, an electronic picture frame, and the like. For example, the display device 101 may be implemented as various types of devices such as an image processing device including a set-top box that does not have a display, a household home appliance including a refrigerator and a washing machine, and an information processing device including a computer body. Hereinafter, for convenience of description, it will be described on the assumption that the display device 101 is implemented as the TV, but the embodiment is not limited thereto.

Referring to FIG. 1, the display device 101 according to an embodiment may include a power supplier 110 and load circuitry 140 operated by power provided from the power supplier 110. According to an embodiment, the load circuitry 140 may include one or more circuit elements for executing one or more functions related to the display device 101, by using power provided from the power supplier 110 through a power line. Referring to FIG. 1, the load circuitry 140 may include a signal processor 142, a displaying device 144, an audio outputting circuit 148, and/or a signal receiver 134.

Hereinafter, a 'unit' may indicate a group of one or more circuit elements driven based on power. The circuit element included in the group may include a passive element such as a resistor, an inductor, and a capacitor, and an active element such as a transistor, a diode, and an operational amplifier. The circuit element included in the group may include an integrated circuit (IC) in which one or more passive elements and/or one or more active elements are integrated. For example, at least a part of the load circuitry 140 distinguished based on the unit may be integrated in a System-on-Chip (SoC). The circuit elements included in the group may be electronically and/or operably coupled with each other in the display device 101, in order to execute one or more functions related to the display device 101. The type and/or number of hardware component included in the display device 101 is not limited to that illustrated in FIG. 1. For example, the display device 101 may include only a part of the hardware component illustrated in FIG. 1.

Referring to FIG. 1, the power supplier 110 of the display device 101 according to an embodiment may be electrically connected to a power source 100 provided from a distribution system formed outside the display device 101. The display device 101 may include a power plug electrically connecting the power supplier 110 and the power source 100. Through the power plug, the power supplier 110 of the display device 101 may receive an alternate current signal (AC signal) from the power source 100. The AC signal received by the power supplier 110 is a power signal having a voltage that changes over time, for example, the voltage of the AC signal may change according to a sinusoidal wave having a preset frequency (e.g., 60 Hz) and a preset amplitude (e.g., 220V and/or 110V). According to an embodiment, the display device 101 may include a controller 120 for controlling the power supplier 110.

In FIG. 1, the controller 120 is illustrated in a block separated from the power supplier 110, the embodiment is not limited thereto, and the controller 120 may be included in the power supplier 110. A structure of the power supplier 110 according to an embodiment will be described later with reference to FIG. 4. For example, the power supplier 110 may include a Switched-Mode Power Supply (SMPS).

According to an embodiment, the signal processor 142 of the display device 101 may perform signal processing related to an image to be displayed through the displaying device 144. For example, the signal processor 142 may generate a video signal indicating an image to be displayed by the displaying device 144 from a data signal broadcast through a wired network and/or a wireless network. From the data signal, the signal processor 142 may generate an audio signal indicating a sound to be played by the audio outputting circuit 148. For example, the signal processor 142 may include an Analog-to-Digital (AD) board.

According to an embodiment, the signal processor 142 of the display device 101 may include a processor and/or memory for executing one or more functions related to the display device 101. In an embodiment, the signal processor 142 may be electrically connected to one or more switches and/or circuitry (e.g., the signal receiver 134 of FIG. 1) for obtaining a user input. For example, at least one or more switches may be exposed outside at least partially through a housing of the display device 101. For example, the signal processor 142 may change a video signal outputted to the displaying device 144 based on a user input related to the display device 101. For example, the signal processor 142 may include a main board.

According to an embodiment, the displaying device 144 of the display device 101 may output light, which are controlled by the signal processor 142, for outputting an image (e.g., an image and/or a video including visualized information). For example, the displaying device 144 may include a backlight panel and/or a display panel. The backlight panel may include one or more Light Emitting Diodes (LEDs), and/or one or more Fluorescent lamps, such as Cold Cathode Fluorescent Lamp (CCFL). The display panel may include a Flat Panel Display (FPD). The FPD may include a Liquid Crystal Display (LCD), a Plasma Display Panel (PDP), and/or one or more Light Emitting Diodes (LED). The LED may include Organic LED (OLED). In an embodiment, the displaying device 144 may include electronic paper.

According to an embodiment, the audio outputting circuit 148 of the display device 101 may include hardware (e.g., one or more speakers, and/or one or more vibration speakers) for operating by a power signal provided from the power supplier 110 and outputting an audio signal. In an embodiment in which the audio outputting circuit 148 includes a plurality of speakers and/or communicates with the plurality of speakers, the display device 101 may provide stereoscopic sound based on the plurality of speakers.

According to an embodiment, the display device 101 may include a signal receiver 130 for communicating with the external electronic device 150 for obtaining the user input, such as a remote control. The signal receiver 130 may receive a signal transmitted from the external electronic device 150 based on a wireless communication protocol such as infrared communication, Bluetooth, and/or Wi-Fi. The signal receiver 130 may be disposed in another unit of the load circuitry 140 and/or a part of the display device 101 separated from the circuitry in order to receive the signal transmitted from the external electronic device 150. For example, the signal receiver 130 may be disposed on one surface (e.g., a front surface) of the display device 101 on which the display panel of the displaying device 144 is disposed. For example, in case that the signal receiver 130 includes a photodiode for receiving a signal based on infrared light, at least a part of the photodiode may be exposed from the front surface of the display device 101 to the outside. Hereinafter, the signal received by the signal receiver 130 may be referred to as a control signal, a control signal in form of infrared light, and/or an IR signal.

In an embodiment, the number of the signal receiver 130 included in the display device 101 may be one or more. Referring to FIG. 1, a signal receiver 132 that transmits a signal wirelessly received from the external electronic device 150 to the controller 120 by being connected to the controller 120 for controlling the power supplier 110 is illustrated. Referring to an embodiment of FIG. 1, the signal receiver 134 that transmits the signal wirelessly received from the external electronic device 150 to the signal processor 142 by being connected to the signal processor 142 is illustrated. Hereinafter, the signal receivers 132 and 134 may be referred to the signal receiver 130. According to an embodiment, a structure of the signal receiver 130 included in the display device 101 will be described in detail with reference to FIG. 3.

According to an embodiment, the external electronic device 150 for communicating with the display device 101 may wirelessly output a signal based on a user's preset action and/or gesture. Referring to FIG. 1, the external electronic device 150 may include a signal transmitter 160, a switch 170, and/or a power supplier 180. The switch 170 of the external electronic device 150 may include one or more buttons (e.g., a button 152) that can be pressed by the user. In some embodiments, the external electronic device 150 may include, as hardware for detecting the user's action, at least one of a Touch Sensor Panel (TSP) for detecting contact of the user's body part (e.g., a fingertip), a rotatable dial by the user, or an Inertial Measurement Unit (IMU) for detecting movement of the external electronic device 150 by the user. Hereinafter, the external electronic device 150 may be referred to as a remote controller.

Referring to FIG. 1, the power supplier 180 of the external electronic device 150 may output power for driving circuitry (e.g., the signal transmitter 160 and/or the switch 170) of the external electronic device 150 based on a means for storing power, such as a battery. In response to identifying a user input related to the external electronic device 150 by using the switch 170, the signal transmitter 160 of the external electronic device 150 may transmit a signal indicating the identified user input. For example, during a time section having a preset duration (e.g., 45 milliseconds (ms) to 80 ms), such as a frame, the signal transmitter 160 may transmit a single signal. The signal transmitted by the external electronic device 150 according to an embodiment will be described later with reference to FIGS. 5 to 7.

The display device 101 according to an embodiment may operate in any one state among a plurality of preset states after being connected to the power source 100. The plurality of preset states may include, for example, an active state in which the display device 101 outputs the image through the displaying device 144 while receiving a power signal from the power source 100. The preset states may include a stand-by state in which the display device 101 at least temporarily stops outputting the image through the displaying device 144 while receiving the power signal from the power source 100. In each of the plurality of preset states, the power supplier 110 of the display device 101 may operate differently. For example, a state of the power supplier 110 may match the active state and the stand-by state. For example, in the active state, the power supplier 110 may provide power having a voltage exceeding a preset level to the load circuitry 140. For example, in the stand-by state, the power supplier 110 may stop providing the power to the load circuitry 140 at least temporarily, and/or may provide power having a voltage less than the preset level. Hereinafter, the stand-by state may be referred to as an idle state and/or a sleep state.

According to an embodiment, the state of the power supplier 110 of the display device 101 may be switched between the active state and the stand-by state by the controller 120. According to an embodiment, the controller 120 may toggle the power supplier 110 based on pressing of a preset button (e.g., a power button exposed to the outside through one surface of the display device 101) of the display device 101 and/or reception of a preset signal (e.g., a signal for notifying that the button 152 of the external electronic device 150 has been pressed) received from the external electronic device 150 through the signal receiver 132. For example, while the power supplier 110 operates based on the active state, the controller 120 may switch the state of the power supplier 110 to the stand-by state based on receiving the preset signal through the signal receiver 132. For example, while the power supplier 110 operates based on the stand-by state, the controller 120 may switch the state of the power supplier 110 to the active state based on identifying that the preset button of the display device 101 has been pressed.

According to an embodiment, the controller 120 of the display device 101 may control a state of the signal receiver 130 of the display device 101, such as the signal receiver 132, differently in the active state or the stand-by state in order to reduce power consumption of the display device 101 in the stand-by state. For example, in the stand-by state, the controller 120 may cause the signal receiver 132 to at least temporarily stop consuming the power to receive the signal from the external electronic device 150. According to an embodiment, an operation of the controller 120 of the display device 101 will be described with reference to FIGS. 8 to 10.

For example, in the stand-by state, the controller 120 may discretely make circuitry of the signal receiver 132 to an opened-circuit. In the active state, the controller 120 may continuously make the circuitry of the signal receiver 132 to a closed-circuit. While the signal receiver 132 is switched from the closed-circuit to the opened-circuit by the controller 120, it may be ceased that the signal receiver 132 consumes power. As it is ceased that the signal receiver 132 consumes power, power consumption by the signal receiver 132 may be reduced. In some embodiments, the signal receiver 132 does not at least temporarily receive the power, while the controller 120 may detect the signal transmitted from the external electronic device 150 by using the signal receiver 132. A structure of the controller 120 and the signal receiver 132 for controlling the power consumption of the signal receiver 132 will be described in detail with reference to FIGS. 2A to 2C.

Figure 2A:
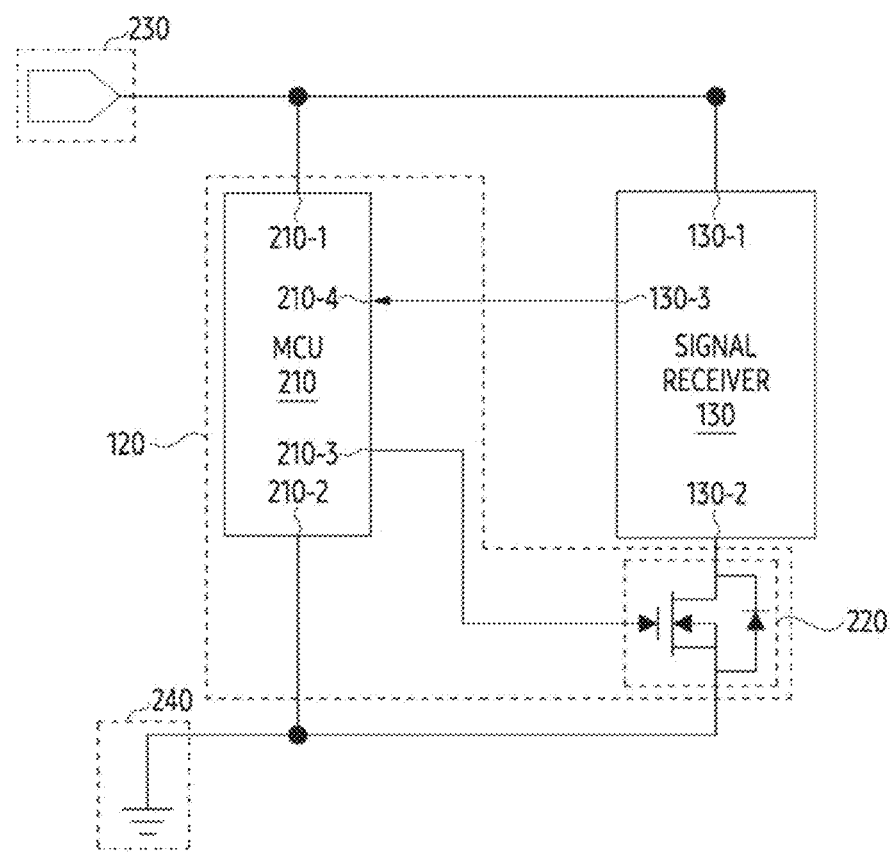
FIGS. 2A to 2C are example block diagrams of a signal receiver and a controller of a display device according to an embodiment.
Figure 2B:
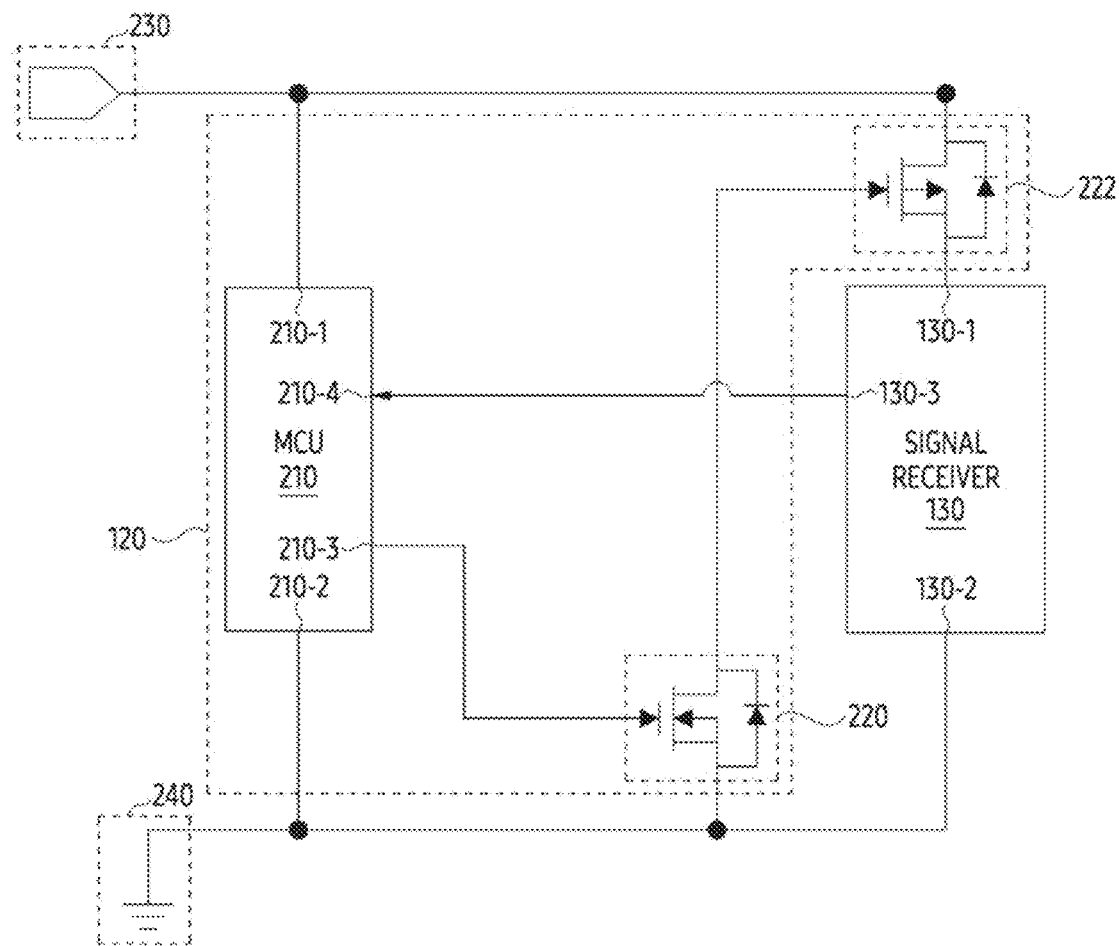
Figure 2C:
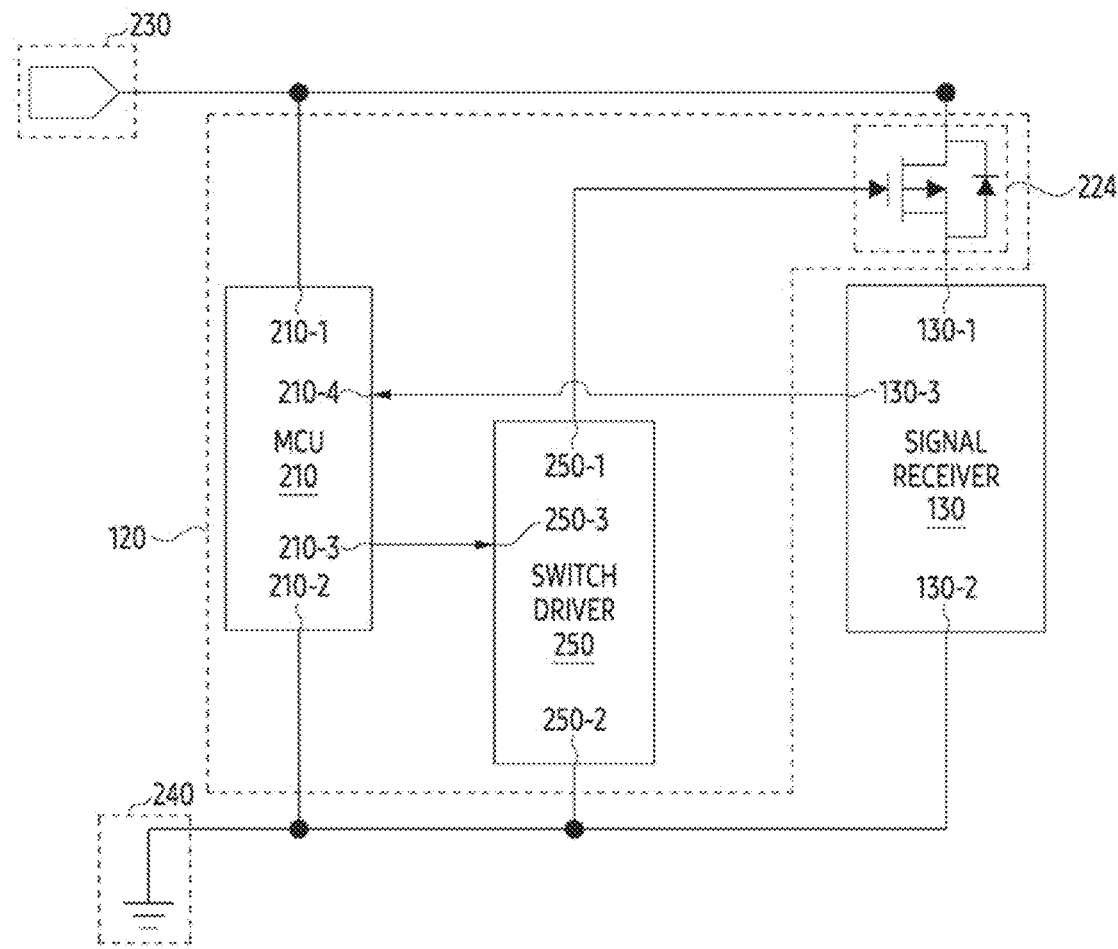

FIGS. 2A to 2C are example block diagrams of a signal receiver 130 and a controller 120 of a display device according to an embodiment. The display device of FIGS. 2A to 2C may be an example of a display device 101 of FIG. 1. For example, the signal receiver 130 and the controller 120 of FIGS. 2A to 2C may be an example of a signal receiver 132 and the controller 120 of FIG. 1.

Referring to FIGS. 2A to 2C, according to an embodiment, the controller 120 and the signal receiver 130 of the display device may be electrically connected to a node 230 to which a preset voltage is applied and a ground node 240. The node 230 and the ground node 240 may be provided for drive of the controller 120 and/or the signal receiver 130 from the power supplier (e.g., a power supplier 110 of FIG. 1) of the display device. For example, a voltage of a preset level for drive of the controller 120 and/or the signal receiver 130 may be applied to the node 230. Referring to FIGS. 2A to 2C, according to an embodiment, the controller 120 of the display device may include a microcontroller unit (MCU) 210 including the ends 210-1 and 210-2 respectively connected to the node 230 and the ground node 240. Similarly, the signal receiver 130 may include ends 130-1 and 130-2 for being respectively connected to the node 230 and the ground node 240. The MCU 210 and/or the controller 120 including the MCU 210 may be referred to as a controller.

Referring to FIGS. 2A to 2C, as it is connected to both the node 230 and the ground node 240, the controller 120 and the signal receiver 130 may be activated based on a potential difference between the node 230 and the ground node 240. For example, as the closed-circuit is established in each of the controller 120 and the signal receiver 130 by the node 230 and the ground node 240, the controller 120 and the signal receiver 130 may be activated. According to an embodiment, the controller 120 of the display device conditionally establishes a closed-circuit related to the signal receiver 130, by adjusting an electrical connection between the node 230 and the signal receiver 130, and/or an electrical connection between the ground node 240, and the signal receiver 130. Hereinafter, different embodiments of the signal receiver 130 and the controller 120 for reducing power consumption by the signal receiver 130 will be described with reference to FIGS. 2A to 2C.

Referring to FIG. 2A, according to an embodiment, the controller 120 may include a switch 220 for establishing an electrical connection between the end 130-2 of the signal receiver 130 and the ground node 240. In an embodiment in which the switch 220 is implemented as an N-channel Metal-Oxide-Semiconductor Field-Effect Transistor (MOSFET), a drain of the switch 220 may be connected to the end 130-2 of the signal receiver 130, and a source of the switch 220 may be connected to the ground node 240. A gate of the switch 220 may be connected to an end 210-3 of the MCU 210. The end 210-3 of the MCU 210 may correspond to a General Purpose Input/Output (GPIO) pin in an embodiment in which the MCU 210 is implemented as an IC.

Based on the characteristic of the N-channel MOSFET, a flow of current between the drain and the source of the switch 220 may occur in case that a gate-source voltage Vgs of the switch 220 exceeds a threshold. In an embodiment of FIG. 2A in which the source of the switch 220 is connected to the ground node 240, the MCU 210 may allow the flow of current between the drain and the source of the switch 220, by applying a voltage having a level exceeding the threshold to the end 210-3. The current flowing between the drain and the source in the switch 220 may cause the potential difference between the node 230 and the ground node 240 to be applied to the signal receiver 130. For example, the signal receiver 130 may be activated based on the current flowing between the drain and the source of the switch 220. For example, in the signal receiver 130, a closed-circuit based on the current flowing between the drain and the source of the switch 220 may be established.

For example, in case that the MCU 210 applies a voltage at a level less than the threshold to the end 210-3, the flow of current between the drain and the source of the switch 220 may be blocked. As the flow of current between the drain and the source of the switch 220 is blocked, the provision of the potential difference between the node 230 and the ground node 240 to the signal receiver 130 may be ceased. In this case, the signal receiver 130 may be disabled by the switch 220. For example, as the flow of current between the drain and the source of the switch 220 is blocked, the closed-circuit of the signal receiver 130 may be opened.

Referring to FIG. 2B, an example of a controller 120 including the switch 220 that is the N-channel MOSFET and a switch 222 that is a P-channel MOSFET is illustrated. In an embodiment of FIG. 2B, the controller 120 may adjust power consumption of the signal receiver 130 by adjusting an electrical connection between the node 230 and the end 130-1 of the signal receiver 130. For example, the gate of the switch 220 may be connected to the ground node 240, and the drain of the switch 220 may be connected to a gate of the switch 222. A drain of the switch 222 may be connected to the node 230 provided from the power supplier, and a source of the switch 222 may be connected to the end 130-1 of the signal receiver 130. Similar to the switch 220 of FIG. 2A, the gate of the switch 220 of FIG. 2B may at least temporarily receive a voltage exceeding a threshold compared to the ground node 240 from the MCU 210, by being connected to the end 210-3 of the MCU 210.

Based on the characteristic of the P-channel MOSFET, a flow of current between the drain and the source of the switch 222 may occur in case that a gate-source voltage Vgs of the switch 222 is less than a threshold. For example, in case that a voltage at a level exceeding a threshold from the end 210-3 of the MCU 210 is applied to the gate of the switch 220, as a voltage of the gate of the switch 222 decreases to a voltage of the ground node 240 by the activated switch 220, the gate-source voltage of the switch 222 may decrease to less than the threshold. In the above example, as the gate-source voltage of the switch 222 decreases to less than the threshold, the flow of current between the drain and the source of the switch 222 may occur. The flow of current generated by the switch 222 may cause the signal receiver 130 to be activated.

For another example, in case that the switch 220 is disabled as the voltage at the level less than the threshold is applied to the gate of the switch 220, the gate of the switch 222 may be electrically separated from the ground node 240. As the gate of the switch 222 is electrically separated from the ground node 240, the flow of current between the drain and the source of the switch 222 may be blocked. The signal receiver 130 may be disabled by blocking the flow of current of the switch 222.

Referring to FIG. 2C, an example of the controller 120 including a switch 224 that is the N-channel MOSFET, for controlling an electrical connection between the end 130-1 of the signal receiver 130 and the node 230 is illustrated. A drain of the switch 224 that is the N-channel MOSFET, may be connected to the node 230, and a source may be connected to the end 130-1 of the signal receiver 130. Referring to FIG. 2C, according to an embodiment, the controller 120 may include a switch driver 250 for adjusting a voltage of a gate of the switch 224 based on the characteristic of the N-channel MOSFET activated based on whether the gate-source voltage exceeds the threshold. For example, the switch driver 250 may include an end 250-1 connected to the gate of the switch 224, an end 250-2 connected to the ground node 240, and an end 250-3 connected to the end 210-3 of the MCU 210.

In an embodiment, the switch driver 250 may increase a voltage applied to the gate of the switch 224 through the end 250-1 to a level at which the threshold is combined with the voltage of the node 230, based on the control signal received from the end 210-3 of the MCU 210. For example, the switch driver 250 may include a circuit for voltage boosting, such as a charge pump, in order to apply a voltage exceeding the voltage of the node 230 to the gate of the switch 224. For example, the switch driver 250 may activate the switch 224 based on the control signal received from the MCU 210. The signal receiver 130 may be activated based on obtaining power through the activated switch 224. For another example, the switch driver 250 may disable the switch 224 by changing the voltage applied to the gate of the switch 224 to be less than or equal to the level based on the control signal received from the end 210-3 of the MCU 210. As the switch 224 is disabled, the receiving of the voltage of the node 230 by the signal receiver 130 may be ceased. As the receiving of the voltage of the node 230 by the signal receiver 130 is ceased, the signal receiver 130 may be disabled.

As described above, according to an embodiment, the MCU 210 of the controller 120 may control supply of power to the signal receiver 130 by using at least one of the switches 220, 222, and 224. For example, the MCU 210 may control the supply of power to the signal receiver 130 based on whether the signal receiver 130 has received a signal from an external electronic device (e.g., an external electronic device 150 of FIG. 1). Referring to FIGS. 2A to 2C, according to an embodiment, the signal receiver 130 may include an end 130-3 for outputting information related to the signal received from the external electronic device. According to an embodiment, the MCU 210 may include an end 210-4 connected to the end 130-3 of the signal receiver 130. According to an embodiment, the MCU 210 may periodically activate the signal receiver 130 by using at least one of the switches 220, 222, and 224 in a stand-by state. Based on the periodically activated signal receiver 130, the MCU 210 may continuously activate the signal receiver 130 in response to identifying a signal transmitted from the external electronic device. For example, in case that the signal transmitted from an external electronic device includes preset information for switching the display device to an active state, the MCU 210 may switch the display device to the active state by controlling the power supplier of the display device.

Hereinafter, a structure of the signal receiver 130 of FIGS. 2A to 2C will be described with reference to FIG. 3.

Figure 3:
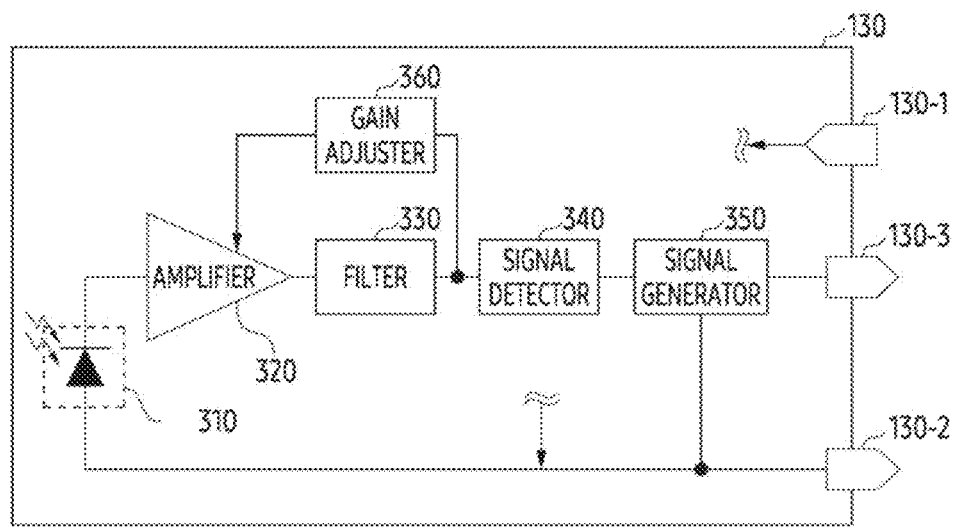
FIG. 3 is an example block diagram of a signal receiver for receiving a signal from an external electronic device, in a display device according to an embodiment.

FIG. 3 is an example block diagram of a signal receiver 130 for receiving a signal from an external electronic device, in a display device according to an embodiment. The display device of FIG. 3 may be an example of a display device 101 of FIG. 1. For example, the signal receiver 130 of FIG. 3 may be an example of the signal receiver 130 of FIG. 1 and/or the signal receiver 130 of FIGS. 2A to 2C.

Referring to FIG. 3, according to an embodiment, the signal receiver 130 of the display device may include a photodiode 310, an amplifier 320, a filter 330, a signal detector 340, and a signal generator 350. The photodiode 310 may include an anode connected to an end 130-2 of the signal receiver 130 and a cathode connected to the amplifier 320. A voltage and/or current of the photodiode 310 may be changed based on a signal (e.g., a signal reaching the photodiode 310 from an external electronic device 150 of FIG. 1) of a preset wavelength (e.g., an infrared light). For example, the voltage of the photodiode 310 may be changed according to a waveform of the signal reaching the photodiode 310. The voltage and/or current changed based on the photodiode 310 may be referred to as an electrical signal outputted from the photodiode 310. In an embodiment, in the photodiode 310, conversion from light of the preset wavelength to the electrical signal may be performed.

According to an embodiment, the amplifier 320 of the signal receiver 130 may amplify the electrical signal outputted from the photodiode 310. The signal receiver 130 may include a gain adjuster 360 for controlling a gain (e.g., a ratio between an amplitude of the electrical signal inputted to the amplifier 320 and an amplitude of the electrical signal amplified by the amplifier 320) of the amplifier 320. The filter 330 of the signal receiver 130 may selectively output an electric signal of a preset carrier frequency (e.g., 30 kHz to 40 kHz) from the electric signal amplified by the amplifier 320. For example, the filter 330 may filter an electrical signal based on a band-pass filter (BPF). Referring to FIG. 3, the gain adjuster 360 may adjust the gain of the amplifier 320 based on the electrical signal filtered by the filter 330. For example, based on the gain adjuster 360, the signal receiver 130 may improve a gain for a signal of the carrier frequency.

According to an embodiment, the signal detector 340 of the signal receiver 130 may activate the signal generator 350 based on the electrical signal (e.g., a signal having the carrier frequency) filtered by the filter 330. For example, the signal detector 340 may compare the filtered electrical signal to a threshold, based on Automatic Threshold Control (ATC) and a comparator. The threshold may be adjusted by the signal detector 340 for filtering of noise. For example, the signal detector 340 may output an electrical signal having a level exceeding the threshold to the signal generator 350. According to an embodiment, the signal generator 350 may output an electrical signal that the signal detector 340 exceeds the threshold through an end 130-3. The signal generator 350 may change a frequency (e.g., the carrier frequency) of the electrical signal received from the signal detector 340 to a frequency of a baseband. The signal generator 350 may output an electrical signal having the frequency of the baseband through the end 130-3 of the signal receiver 130.

Circuitry (e.g., the photodiode 310, the amplifier 320, the filter 330, the signal detector 340, the signal generator 350, and the gain adjuster 360) included in signal receiver 130 may be activated based on a potential difference between the ends 130-1 and 130-2 of signal receiver 130. The circuitry included in the signal receiver 130 may operate based on the potential difference between the ends 130-1 and 130-2. As the circuitry of the signal receiver 130 operate, a flow of current may be generated in each of the ends 130-1 and 130-2. As described above in FIGS. 2A to 2C, a voltage (e.g., a DC voltage) of a preset level may be applied to the end 130-1 of the signal receiver 130, and a node having a reference voltage, such as a ground node, may be connected to the end 130-3. The potential difference between the ends 130-1 and 130-2 may cause the flow of current in the circuitry included in the signal receiver 130. A closed-circuit may be established in the signal receiver 130 based on the flow of current.

According to an embodiment, a controller (e.g., a controller 120 of FIG. 1, and/or FIGS. 2A to 2C) for controlling the signal receiver 130 may adjust circuitry included in the signal receiver 130 between the closed-circuit and an opened-circuit. For example, the controller may control a flow of current transmitted to the circuitry of the signal receiver 130 through the end 130-1 by using a switch (e.g., switches 222 and 224 of FIG. 2B and/or 2C) adjacent to the end 130-1 of the signal receiver 130. For example, the controller may control a flow of current transmitted from circuitry of the signal receiver 130 through the end 130-2 by using a switch (e.g., a switch 220 of FIG. 2A) adjacent to the end 130-2 of the signal receiver 130. For example, in case that a flow of current at the ends 130-1 and 130-2 is allowed by the controller of the signal receiver 130, the signal receiver 130 may be activated as the circuitry included in the signal receiver 130 become the closed-circuit. For another example, in case that the flow of current of any one of the ends 130-1 and 130-2 is blocked by the controller of the signal receiver 130, the signal receiver 130 may be disabled as the circuitry included in the signal receiver 130 become the opened-circuit. The controller of the signal receiver 130 may reduce power consumption in the signal receiver 130, by at least temporarily disabling the signal receiver 130. According to an embodiment, the controller of the signal receiver 130 may support reception of a signal (e.g., a signal transmitted from the external electronic device 150 of FIG. 1) by the signal receiver 130 while preventing an increase of standby power, by the signal receiver 130, by discretely disabling the signal receiver 130 while a state of the display device is in a stand-by state.

Hereinafter, with reference to FIG. 4, according to an embodiment, in the display device, a structure of the signal receiver 130 and the controller of the signal receiver 130 for preventing the increase of standby power will be described.

Figure 4:
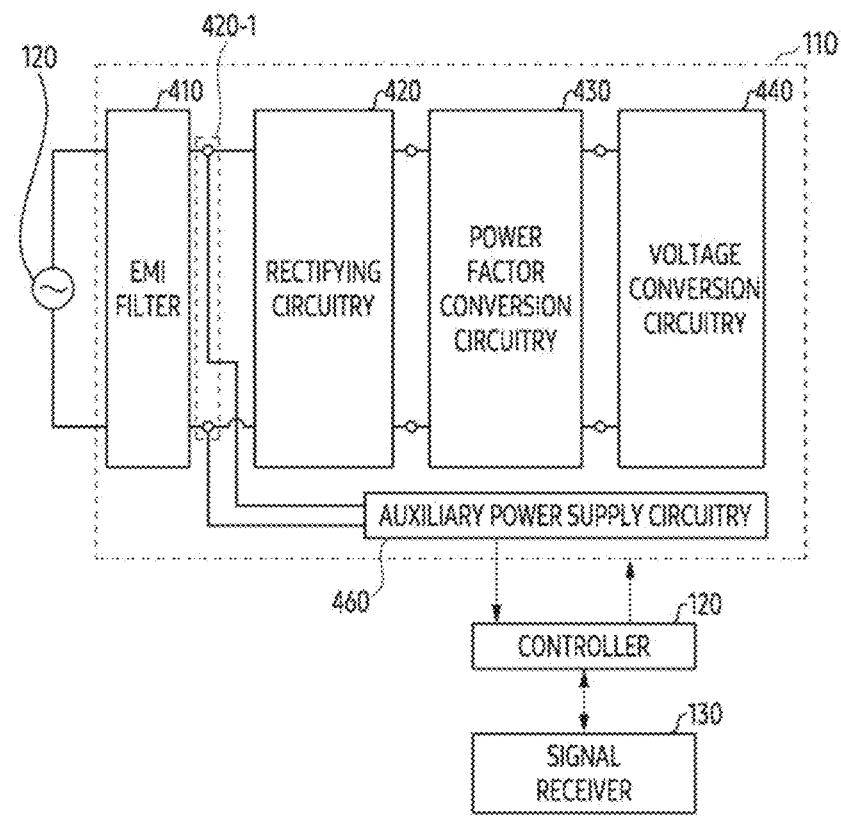
FIG. 4 is an example block diagram for explaining a structure of a signal receiver, a controller, and a power supplier of a display device according to an embodiment.

FIG. 4 is an example block diagram for explaining a structure of a signal receiver 130, a controller 120, and a power supplier 110 of a display device according to an embodiment. The display device of FIG. 4 may be an example of a display device 101 of FIG. 1. For example, the power supplier 110, the controller 120, and the signal receiver 130 of FIG. 4 may be an example of each of the power supplier 110, the controller 120, and the signal receiver 130 of FIG. 1.

Referring to FIG. 4, the power supplier 110 of the display device according to an embodiment may include at least one of an electromagnetic interference (EMI) filter 410, rectifying circuitry 420, power factor conversion circuitry 430, voltage conversion circuitry 440, or auxiliary power supply circuitry 460. A hardware component included in the power supplier 110 is not limited to the example of FIG. 4. In some embodiments, the power supplier 110 may further include circuitry such as lightning protection circuitry, a varistor, and a surge array. According to an embodiment, the EMI filter 410 of the power supplier 110 may remove or reduce noise included in an AC signal of a power source 100. For example, the EMI filter 410 may reduce the noise included in the AC signal based on a line filter. The noise may include a voltage ripple generated by another frequency component different from a frequency component of the AC signal intended by a producer generating the AC signal.

Referring to FIG. 4, according to an embodiment, the rectifying circuitry 420 of the power supplier 110 may receive an AC signal having noise reduced by the EMI filter 410 from the EMI filter 410. The rectifying circuitry 420 according to an embodiment may output a rectified alternate current signal, by rectifying the AC signal of the power source 100. For example, the rectified AC signal outputted from the rectifying circuitry 420 may have a voltage that changes according to an absolute value of the voltage of the AC signal of the power source 100. In order to rectify the AC signal, the rectifying circuitry 420 may include one or more diodes. For example, the rectifying circuitry 420 may include bridge diode circuitry that performs full-wave rectification on the AC signal of the power source 100. For example, the power source 100 may perform half-wave rectification on the AC signal. Circuitry included in the rectifying circuitry 420 are not limited to the bridge diode, and may include circuitry of a non-bridge method. The rectifying circuitry 420 may output the rectified AC signal by using nodes 482 and 284 of FIG. 4.

Referring to FIG. 4, according to an embodiment, the power factor conversion circuitry 430 of the power supplier 110 may generate a flow of current based on a phase and a period of a voltage of the AC signal rectified by the rectifying circuitry 420. According to an embodiment, the power factor conversion circuitry 430 may receive current from the rectifying circuitry 420 based on the phase of the voltage of the AC signal rectified by the rectifying circuitry 420. For example, as the power factor conversion circuitry 430 synchronizes phases of the voltage and the current of the rectified AC signal, a power factor of power transmitted from the power source 100 to the power supplier 110 may be improved. The power factor conversion circuitry 430 may provide power to an output side (e.g., a port between the power factor conversion circuitry 430 and the voltage conversion circuitry 440) different from an input side, while improving the power factor at the input side (e.g., a port between the rectifying circuitry 420 and the power factor conversion circuitry 430).

According to an embodiment, the voltage conversion circuitry 440 of the power supplier 110 may output power having a voltage suitable for drive of load circuitry (e.g., load circuitry 140 of FIG. 1) of a display device connected to the power supplier 110, based on the power provided from the power factor conversion circuitry 430. For example, different circuitry (e.g., a signal processor 142, a displaying device 144, an audio outputting circuit 148, and/or a signal receiver 134) included in the load circuitry may be designed to operate based on a DC voltage of a different magnitude. In the above example, the voltage conversion circuitry 440 may simultaneously apply the DC voltages of the different magnitude to the different circuitry based on multiple outputs. In an embodiment, the power factor conversion circuitry 430 and/or the voltage conversion circuitry 440 may generate the power based on an isolated topology based on a transformer.

In an embodiment, an active state may include a state in which the voltage conversion circuitry 440 provides the power to the load circuitry of the display device. A stand-by state may include a state in which supply of the power by the voltage conversion circuitry 440 is stopped. According to an embodiment, the power supplier 110 may switch between the active state and the stand-by state, by controlling one or more switches included in the rectifying circuitry 420, the power factor conversion circuitry 430, and/or the voltage conversion circuitry 440. In an embodiment, one or more switches included in the power supplier 110 may be controlled based on the controller 120.

Referring to FIG. 4, according to an embodiment, the power supplier 110 may include the auxiliary power supply circuitry 460 for generating the power independently of switching between the active state and the stand-by state. In an embodiment, the auxiliary power supply circuitry 460 may receive the power independently of the rectifying circuitry 420 and circuitry of the output side of the rectifying circuitry 420, by being connected to an input side port 420-1 of the rectifying circuitry 420. The auxiliary power supply circuitry 460 may provide relatively little power to load circuitry of the auxiliary power supply circuitry 460 by the rectifying circuitry 420, the power factor conversion circuitry 430, and the voltage conversion circuitry 440. The auxiliary power supply circuitry 460 may generate power of suitable size to support a function (e.g., a function of switching from the stand-by state to the active state) of the display device related to the stand-by state.

According to an embodiment, the signal receiver 130 and the controller 120 may be connected to the auxiliary power supply circuitry 460. For example, in FIGS. 2A to 2C, the node 230 and the ground node 240 may be formed by a power line extending from the auxiliary power supply circuitry 460. For example, the ground node 240 of FIGS. 2A to 2C may be provided from a part (e.g., primary side circuitry) related to the power source 100 in the power supplier 110 to the controller 120 and/or the signal receiver 130.

As described above, according to an embodiment, the controller 120 may reduce power consumption in the signal receiver 130, by supplying power provided from the auxiliary power supply circuitry 460 to the signal receiver 130 or stopping the supply of the power to the signal receiver 130. According to an embodiment, the controller 120 may switch the state of the display device between the active state or the stand-by state, by controlling the one or more switches included in the rectifying circuitry 420, the power factor conversion circuitry 430, and/or the voltage conversion circuitry 440. The controller 120 may adjust the power supplied to the signal receiver 130 based on the state of the display device such as the active state or the stand-by state, and/or a signal received from an external electronic device (e.g., a remote control). Hereinafter, with reference to FIGS. 5 to 7, according to an embodiment, an operation in which the controller 120 of the display device adjusts the power supplied to the signal receiver 130 based on the state of the display device and/or the signal received from the external electronic device will be described.

Figure 5:
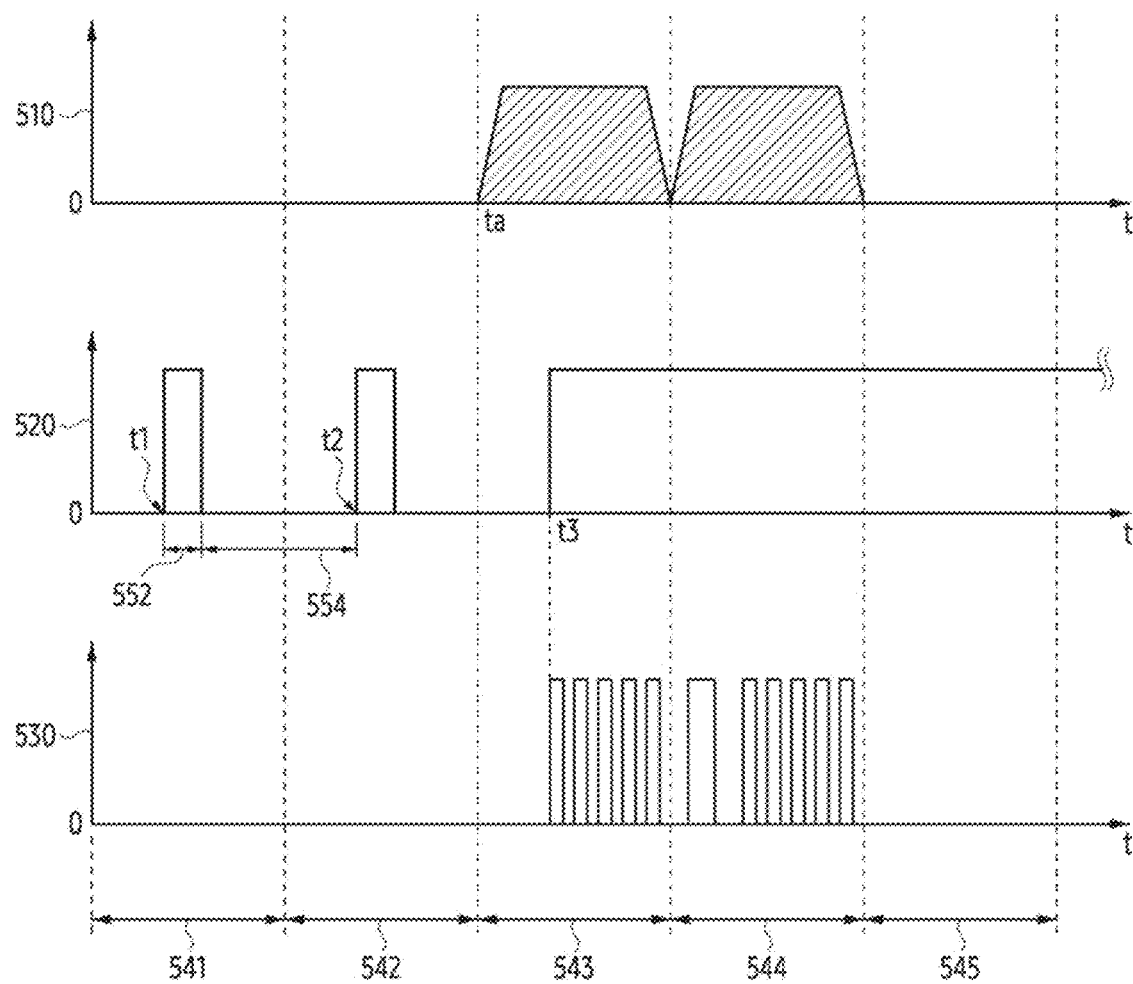
FIG. 5 is a timing diagram for illustrating an example of an operation while a display device receives a signal from an external electronic device, according to an embodiment.

FIG. 5 is a timing diagram for illustrating an example of an operation while a display device receives a signal from an external electronic device, according to an embodiment. The display device of FIG. 5 may be an example of a display device 101 of FIG. 1. The external electronic device of FIG. 5 may include an external electronic device 150 of FIG. 1. Hereinafter, with reference to FIG. 5, according to an embodiment, an operation of a controller (e.g., a controller 120 of FIG. 1) and/or a signal receiver (e.g., a signal receiver 130 of FIG. 1) included in the display device while the display device is switched from a stand-by state to an active state based on a preset signal received from the external electronic device will be described. The preset signal may be generated by the external electronic device based on a user input to a preset button for switching a state of the display device, such as a button 152 of FIG. 1.

Referring to FIG. 5, graphs 510, 520, and 530 indicating a signal and/or a voltage of the display device and/or the external electronic device along a coincident time axis in a time domain are illustrated. The graph 510 indicates a beginning moment at which the external electronic device transmits the signal. For example, based on a user pressing a button of the external electronic device, the external electronic device may output the signal from a beginning moment ta. The external electronic device may continuously output the signal until the user releases pressing the button.

According to an embodiment, the external electronic device may transmit the signal based on a preset frame. The frame may be a duration of a single signal in the time domain. Referring to FIG. 5, time sections 541, 542, 543, 544, and 545 divided based on the frame are illustrated. For example, a length of the time sections 541, 542, 543, 544, and 545 may be a length of the frame. Hereinafter, it is assumed that the external electronic device transmits one or more signals from the ta, which is a beginning moment of the time section 543, in response to identifying a user input that presses the preset button.

Referring to FIG. 5, the graph 520 indicates a potential difference applied to the signal receiver (e.g., the signal receiver 130 of FIGS. 1 and/or 2A to 2C) of the display device according to an embodiment. As described above in FIGS. 2A to 2C, the potential difference applied to the signal receiver of the display device may be changed by the controller (e.g., the controller 120 of FIGS. 1 and/or 2A to 2C). As described above, while the potential difference indicated by the graph 520 becomes a preset level greater than 0, the signal receiver may operate based on the potential difference. The graph 530 indicates a signal output by the signal receiver of the display device. For example, the signal receiver 130 of FIGS. 2A to 2C indicates a signal (e.g., a signal received from the external electronic device and converted to a baseband) outputted through an end 130-3.

According to an embodiment, the controller of the display device may activate or disable the signal receiver according to a preset period in the stand-by state. Referring to the graph 520 of FIG. 5, the controller of the display device may activate the signal receiver by applying a potential difference of a preset level to the signal receiver in a time section 552 having t1 as the beginning moment. In the time section 552, the signal receiver may detect a signal transmitted toward the display device, by being activated based on the applied potential difference. Referring to the graph 510, as the external electronic device does not transmit the signal in the time section 552, the signal receiver may not detect any signal in the time section 552. In response to identifying that the signal receiver may not detect any signal in the time section 552, the controller may disable the signal receiver for a time section 554 after the time section 552. From t2 when the time section 554 expires, the controller of the display device may activate the signal receiver again.

In an embodiment of FIG. 5, a duration of a single period in which the controller of the display device activates the signal receiver may be t2–t1. The duration of the single period may be less than or equal to the length of the frame. Referring to FIG. 5, as the duration of the single period is set to be less than or equal to the length of the frame, the controller may activate the signal receiver at least one time, in each of the time sections 541 and 542 corresponding to a single frame.

Referring to the above assumption, in the time section 543 having ta as the beginning moment, the external electronic device may initiate transmitting the signal. As the controller repeatedly activates the signal receiver according to a preset period less than or equal to the frame length, the signal receiver may be activated at t3 in the time section 543. In the time section 543, the signal receiver may identify a signal transmitted from the ta by the external electronic device after the activated t3. Referring to the graph 530, in response to identifying the signal, from the t3, the signal receiver may output another signal corresponding to the signal received from the external electronic device.

According to an embodiment, the controller may stop repeatedly activating the signal receiver according to the preset period based on the other signal outputted from the external electronic device. For example, in response to receiving the other signal from the signal receiver, the controller may activate the signal receiver for at least one frame or more time sections after the t3. Referring to FIG. 5, even after a length of the time section 552 from the t3, the controller may maintain activation of the signal receiver. In a time section 544 after the time section 543 in which the signal is detected by the signal receiver, the controller may maintain the activation of the signal receiver. For example, in the time section 543, in response to identifying at least a part of the signal received from the external electronic device, the controller may stop repeatedly activating the signal receiver.

For example, in case that the external electronic device transmits a signal indicating the user input continuously for at least two frames, the controller may obtain a single signal transmitted from the external electronic device during the time section 544 based on the signal receiver activated throughout the time section 544. In an embodiment, a single signal transmitted in the single frame may include a first code (e.g., a leader code) for notifying the beginning moment of the single signal, a second coil (e.g., a custom code) indicating a type (e.g., the display device) of target electronic device of the single signal, and a third code (e.g., a data code) including data. The single signal may be concatenated in an order of the first code, the second code, and the third code in the time domain. For example, the data included in the single signal may indicate a user input detected by an external electronic device that generated the single signal. For example, while the button 152 of FIG. 1 is pressed, the signal transmitted by the external electronic device may include an identifier assigned to the button 152.

According to an embodiment, the controller of the display device may control the display device based on data included in the signal received through the time section 544. In an embodiment of FIG. 5, in case that the data included in the signal received in the time section 544 includes preset data for toggling the state of the display device between the active state or the stand-by state, the controller may switch the state of the display device from the stand-by state to the active state. Referring to FIG. 4, the controller 120 may switch the state of the display device to the active state by using at least one switch of rectifying circuitry 420, power factor conversion circuitry 430, or voltage conversion circuitry 440 of a power supplier 110.

In an embodiment of FIG. 5, in case that the data included in the signal received in the time section 544 includes the preset data for toggling the state of the display device between the active state or the stand-by state, the controller may continuously activate the signal receiver instead of repeatedly activating the signal receiver according to the preset period. As the controller continuously activates the signal receiver, in a time section 545 after the time section 544, a potential difference of a preset level exceeding 0 may be continuously applied to the signal receiver. For example, in the time sections 541 and 542 in which the state of the display device is in the stand-by state, the signal receiver may be discretely activated by the controller. In the time section 545 after the state of the display device is switched to the active state, the signal receiver may be continuously activated by the controller.

As described above, according to an embodiment, as the signal receiver is discretely activated in the stand-by state and continuously activated in the active state, power consumption of the signal receiver may be relatively reduced in the stand-by state. The controller may adjust the power consumption in the signal receiver differently according to the state of the display device, by controlling the signal receiver differently in the active state and the stand-by state. For example, the controller may maintain execution of a function (e.g., a function of wirelessly receiving the signal from the external electronic device) of the signal receiver while reducing standby power of the signal receiver.

In an embodiment, as the frame of the signal transmitted by the external electronic device has a length of several ms, or tens of ms, and the external electronic device repeatedly transmits the signal while receiving the user input, one or more signals corresponding to a single user input may be outputted from the external electronic device. According to an embodiment, the controller of the signal receiver may prevent abnormal operation of the display device by a plurality of signals corresponding to the single user input, by controlling supply of power to the signal receiver. For example, the controller of the signal receiver may prevent the plurality of signals from repeatedly executing a function of the display device.

Hereinafter, with reference to FIG. 6, according to an embodiment, an operation for discarding other signals excluding one signal among a plurality of signals generated based on the single user input by the controller of the signal receiver will be described.

Figure 6:
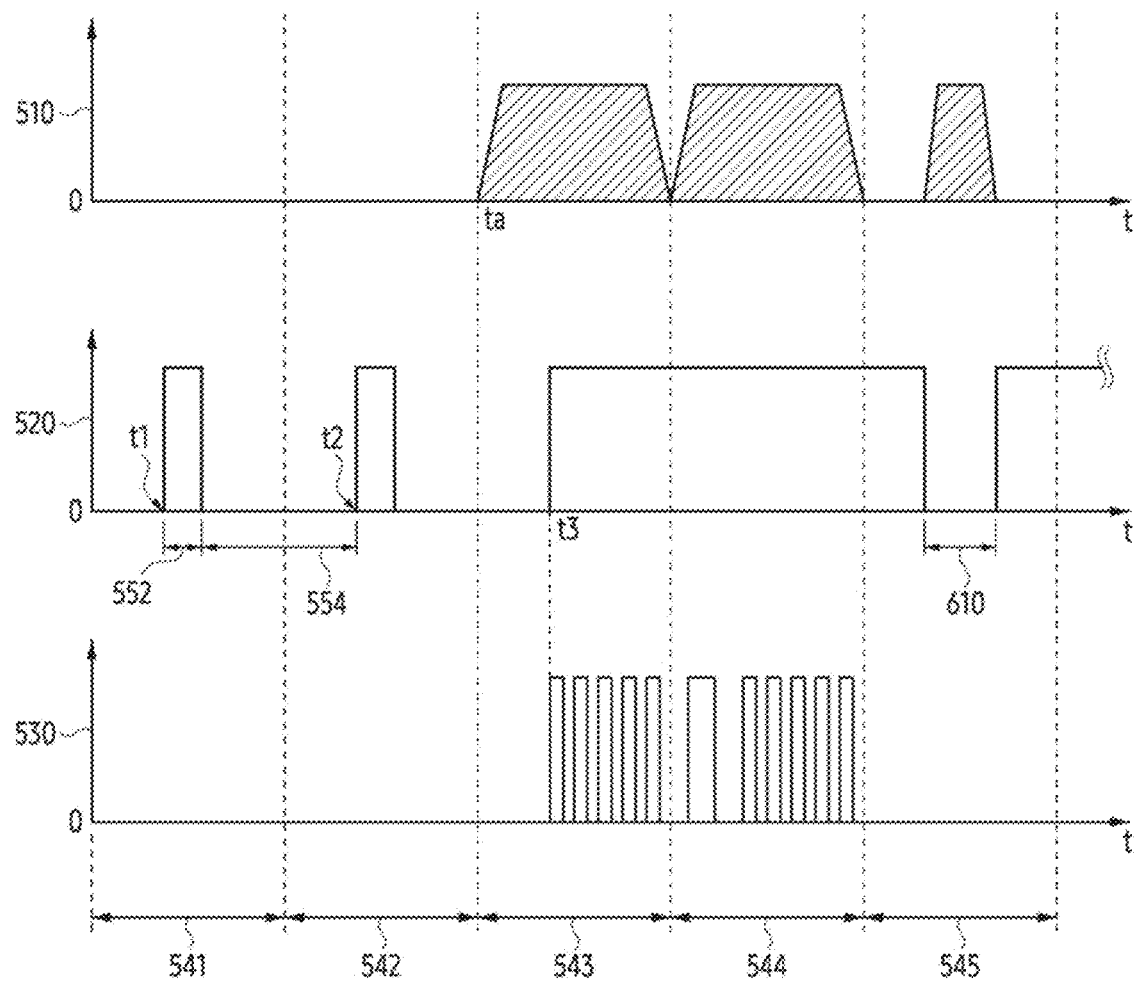
FIG. 6 is a timing diagram for illustrating another example of an operation while a display device receives a signal from an external electronic device, according to an embodiment.

FIG. 6 is a timing diagram for illustrating another example of an operation while a display device receives a signal from an external electronic device, according to an embodiment. The display device of FIG. 6 may be an example of a display device 101 of FIG. 1. The external electronic device of FIG. 6 may include an external electronic device 150 of FIG. 1. Referring to FIG. 6, graphs 510, 520, and 530 indicating a signal and/or a voltage of the display device and/or the external electronic device along a coincident time axis in a time domain are illustrated. At least a part of the graphs 510, 520, and 530 of FIG. 6 may correspond to the graphs 510, 520, and 530 of FIG. 5. For example, an operation of the signal receiver and the controller included in the display device in the time sections 541, 542, 543, and 544 of FIG. 6 may match the operation of the signal receiver and the controller included in the display device in the time sections 541, 542, 543, and 544 of FIG. 5. Among the description of FIG. 6, the description that overlaps with FIG. 5 is omitted.

According to an embodiment, the controller (e.g., a controller 120 of FIG. 1, and/or FIGS. 2A to 2C) of the display device may at least temporarily disable the signal receiver in a second frame concatenated after a first frame in the time domain based on receiving one signal included in the first frame by using the signal receiver. Referring to the graph 520 of FIG. 6, the controller that received one signal from the external electronic device during the time section 544 may disable the signal receiver in a part 610 of a time section 545 after the time section 544. According to an embodiment, as the controller disables the signal receiver, the display device may operate independently of a signal transmitted from the external electronic device in the part 610 of the time section 545.

As described above, according to an embodiment, the controller of the display device may block a second signal transmitted by the external electronic device in the second frame, by controlling the display device based on the first signal received in the first frame and simultaneously disabling the signal receiver in the second frame after the first frame. In this case, even if the external electronic device continuously transmits the first signal and the second signal in response to receiving a single user input, the display device may execute a specific function corresponding to the single user input once based on the first signal among the first signal and the second signal.

According to an embodiment, the controller of the display device may be switched from an active state to a stand-by state based on a signal received from the external electronic device, similar to an embodiment of FIGS. 5 to 6, in which a state of the display device is switched from the stand-by state to the active state. Hereinafter, with reference to FIG. 7, according to an embodiment, an operation in which the controller of the display device is switched from the active state to the stand-by state will be described.

Figure 7:
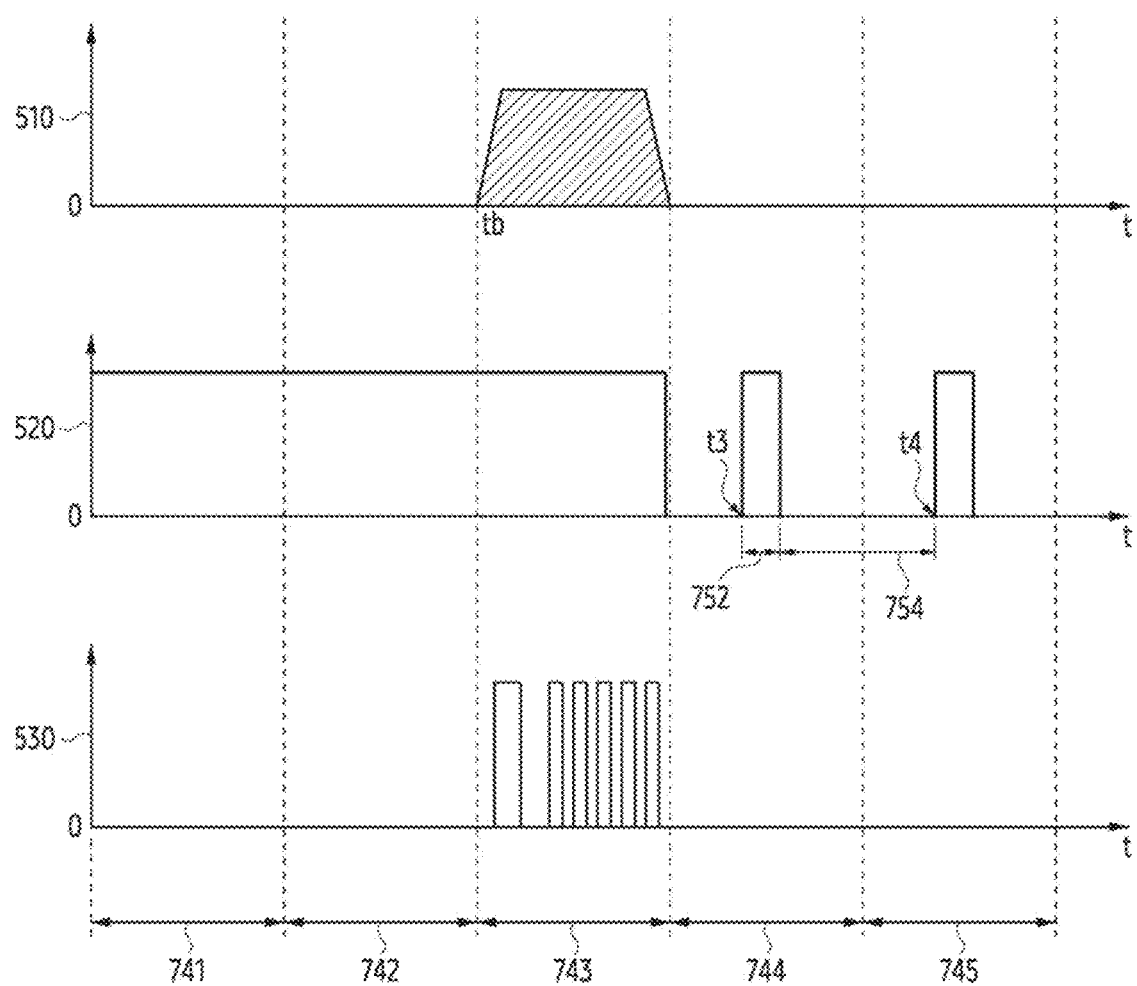
FIG. 7 is a timing diagram for illustrating still another example of an operation while a display device receives a signal from an external electronic device, according to an embodiment.

FIG. 7 is a timing diagram for illustrating still another example of an operation while a display device receives a signal from an external electronic device, according to an embodiment. The display device of FIG. 7 may be an example of a display device 101 of FIG. 1. The external electronic device of FIG. 7 may include an external electronic device 150 of FIG. 1. Hereinafter, with reference to FIG. 7, according to an embodiment, while the display device is switching from an active state to a stand-by state based on a preset signal received from the external electronic device, an operation of a controller (e.g., a controller 120 of FIG. 1) and/or a signal receiver (e.g., a signal receiver 130 of FIG. 1) included in the display device will be described. The preset signal may be outputted from the external electronic device, in response to a gesture of pressing a preset button for alternating a state of the display device between the active state and the stand-by state, such as a button 152 of FIG. 1.

Graphs 510, 520, and 530 of FIG. 7 may indicate a signal and/or a voltage of the display device and/or the external electronic device along a coincident time axis in a time domain, such as the graphs 510, 520, and 530 of FIG. 5. For example, the graph 510 indicates a beginning moment at which the external electronic device transmits the signal. For example, the graph 520 indicates a potential difference applied to the signal receiver of the display device according to an embodiment. For example, the graph 530 indicates a signal that the signal receiver outputs to the controller. Referring to FIG. 7, similar to time sections 541, 542, 543, 544, and 545 of FIG. 5, time sections 741, 742, 743, 744, and 745 divided based on a frame are illustrated.

Referring to the graph 520 of FIG. 7, according to an embodiment, in the time sections 741, 742, and 743 in which the display device operates based on the active state, the controller may maintain activation of the signal receiver. For example, in each of the time sections 741, 742, and 743, a duty ratio of the potential difference applied to the signal receiver may be adjusted to a preset duty ratio, such as 100%, by the controller.

As shown in the graph 510 of FIG. 7, it is assumed that the external electronic device outputs a signal from a beginning moment tb based on the user pressing a preset button (e.g., a power button) of the external electronic device such as a remote control. The signal outputted by the external electronic device may include at least one of data indicating a target electronic device (e.g., the display device 101 of FIG. 1) of the signal or data related to the preset button. Referring to the graph 530 of FIG. 7, according to an embodiment, the signal receiver may transmit another signal indicating the signal outputted from the external electronic device to the controller based on the signal outputted from the external electronic device in the time section 743 including the beginning moment tb. According to an embodiment, in response to receiving the other signal from the signal receiver, the controller may identify whether the signal outputted from the external electronic device is a signal notifying a user input related to the preset button, based on data included in the other signal. In case that the signal outputted from the external electronic device is the signal notifying the user input related to the preset button, according to an embodiment, the controller may switch the state of the display device from the active state to the stand-by state.

Referring to FIG. 7, after the time section 743 in which a preset signal for switching the state of the display device is received, the controller may activate the signal receiver based on a preset period less than a length of the frame, and/or a duty ratio less than the preset duty ratio. For example, in the time section 744 after the time section 743, the controller may activate the signal receiver for a time section 752 less than the length of the frame. For example, the duty ratio of the potential difference applied to the signal receiver indicated by the graph 520 may be reduced to less than 100% in the time section 744 based on a ratio between the time sections 752 and 744. After the time section 752, the controller may deactivate the signal receiver during a time section 754. The lengths of the time sections 752 and 754, for example, t4−t3, may coincide with t2−t1, which is a length of the single period of FIG. 5. Similar to the time sections 541 and 542 of FIG. 5, in the time sections 744 and 745, the controller may support receiving the signal from the external electronic device, by periodically activating the signal receiver based on a period less than or equal to the length of the frame.

As described above, according to an embodiment, the controller of the display device may change power consumption of the signal receiver for receiving an infrared signal from the external electronic device based on the state of the display device. For example, while the state of the display device is in the stand-by state, the controller may reduce the power consumption in the stand-by state, by repeatedly disabling the signal receiver. The controller may repeatedly disable the signal receiver according to a period based on a frame of the infrared signal so as to be capable of receiving the infrared signal in the stand-by state.

Hereinafter, with reference to FIGS. 8 to 10, according to an embodiment, an operation of the controller of the display device will be described.

Figure 8:
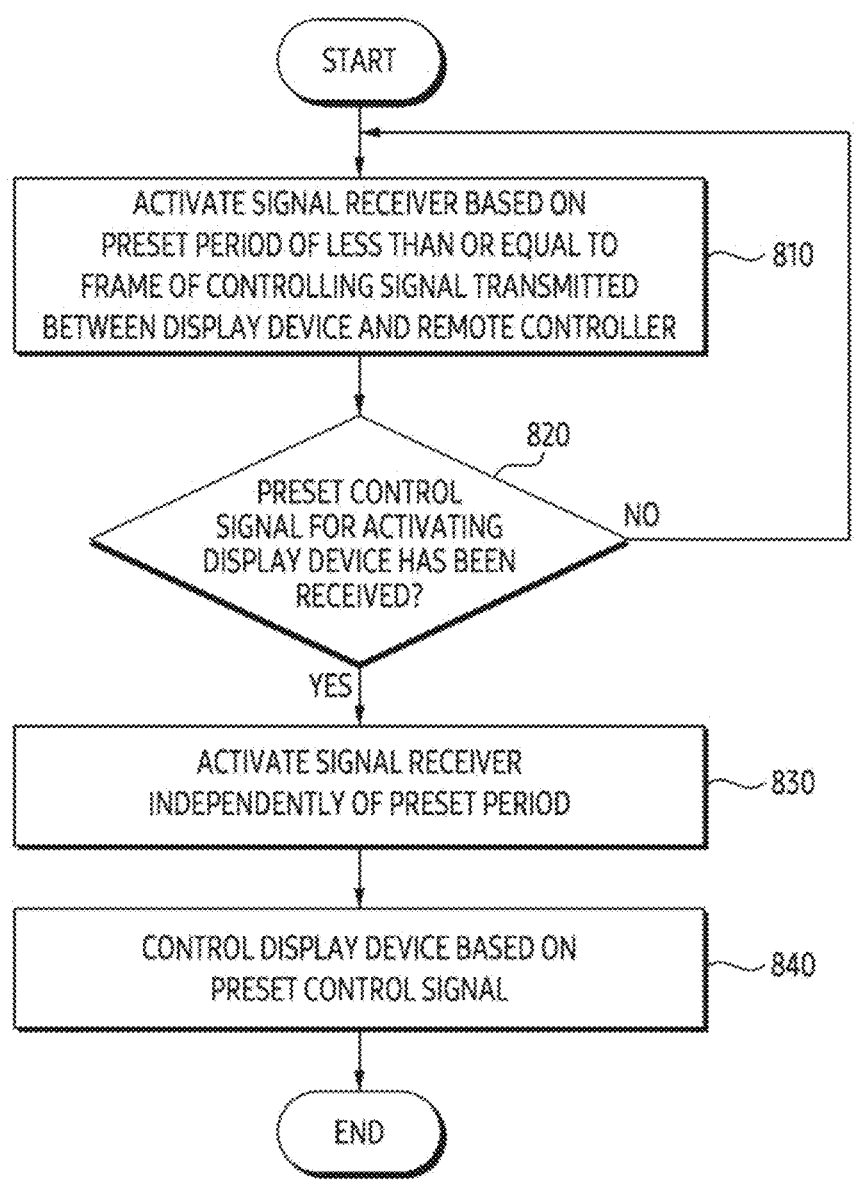
FIG. 8 is a flowchart for illustrating an example of an operation of a display device, according to an embodiment.

FIG. 8 is a flowchart for illustrating an example of an operation of a display device, according to an embodiment. The display device of FIG. 8 may be an example of a display device 101 of FIG. 1. An operation of the display device of FIG. 8 may be performed, for example, by a controller 120 of FIG. 1, a MCU 210 of FIGS. 2A to 2C, and/or a signal receiver 130 (e.g., a first signal receiver 132 connected to the controller 120 of FIG. 1). For example, at least one of the operations of the display device of FIG. 8 may be performed based on instructions stored in the MCU 210 of the controller 120 of FIGS. 2A to 2C.

Referring to FIG. 8, in operation 810, according to an embodiment, the display device may activate the signal receiver based on a preset period of less than or equal to a frame of a controlling signal (e.g., a controlling signal in form of infrared light) transmitted between the display device and a remote controller (e.g., an external electronic device 150 of FIG. 1). For example, the controller of the display device may periodically activate the signal receiver, by controlling the electrical connection for establishment of a closed-circuit of the signal receiver. The operation 810 may be performed while the display device is in another state different from an active state displaying an image, such as a stand-by state. The preset period may be set to a length of less than or equal to a length of the frame in order to support identifying a control signal throughout the frames while the operation 810 is being performed. While the signal receiver is controlled based on the operation 810, as the signal receiver is at least temporarily disabled, power consumption of the signal receiver may be reduced.

Referring to FIG. 8, in operation 820, according to an embodiment, the display device may identify whether a preset control signal for activating the display device has been received. The preset control signal may be generated by another electronic device for remotely controlling the display device, such as the external electronic device 150 of FIG. 1. The preset control signal may include, for example, one or more bits indicated based on an infrared wavelength and based on a carrier frequency. The preset control signal may include data (e.g., an identifier indicating a preset user input) indicating that the preset user input for switching the state of the display device between the stand-by state and the active state has been received, for example, such as a user input pressing a button 152 of FIG. 1. Before receiving the preset control signal (820—No), according to an embodiment, the display device may periodically activate the signal receiver based on the operation 810. According to an embodiment, that the display device performs the operation 820 by using the signal receiver that is periodically activated based on the operation 810 may be performed similarly to the embodiment of FIGS. 5 to 7.

In response to receiving the preset control signal for activating the display device (820—Yes), in operation 830, according to an embodiment, the display device may activate the signal receiver independently of the preset period. For example, based on the operation 830, the display device may activate the signal receiver for each frame, during the length of the frame. For example, based on the operation 830, the display device may maintain a level of a voltage applied to the signal receiver at a preset level exceeding 0.

Referring to FIG. 8, in operation 840, according to an embodiment, the display device may control the display device based on the preset control signal received based on the operation 820. For example, since the preset control signal is a signal for activating the display device, the display device may switch the state of the display device to the active state. For example, the display device may initiate providing power from a power supplier to load circuitry (e.g., load circuitry 140 of FIG. 1), by controlling the power supplier (e.g., a power supplier 110 of FIG. 1). According to an embodiment, an order in which the display device performs the operations 830 and 840 may not be limited to an embodiment of FIG. 8. For example, the display device may simultaneously perform the operations 830 and 840, or may perform the operations 830 and 840 in an order opposite to an order of FIG. 8.

Hereinafter, with reference to FIG. 9, based on a frame of a control signal exchanged between the display device and the remote controller, according to an embodiment, an operation of the display device is described.

Figure 9:
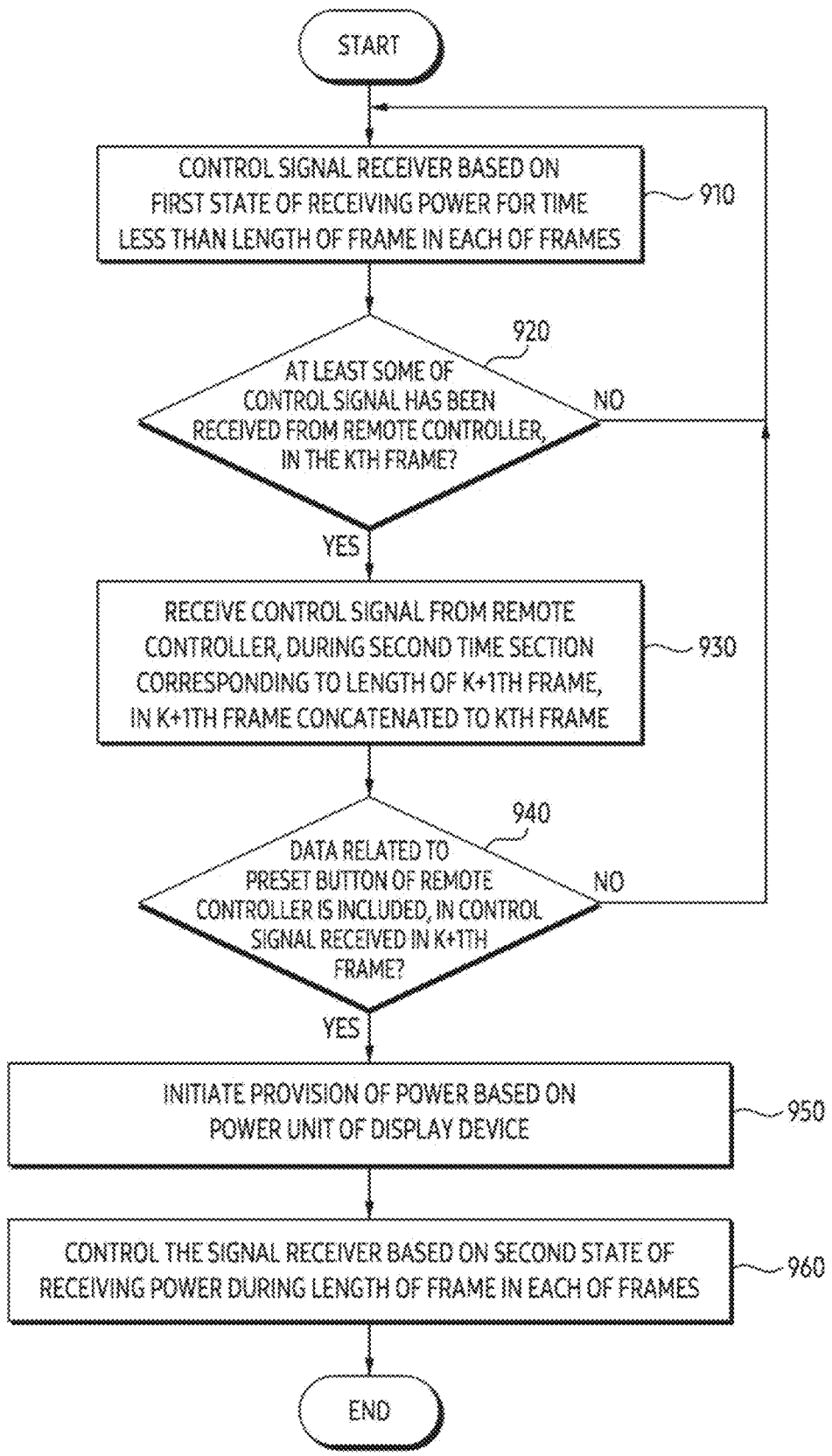
FIG. 9 is a flowchart for illustrating another example of an operation of a display device, according to an embodiment.

FIG. 9 is a flowchart for illustrating another example of an operation of a display device, according to an embodiment. The display device of FIG. 9 may be an example of a display device 101 of FIG. 1. An operation of the display device of FIG. 9 may be performed, for example, by a controller 120 of FIG. 1, a MCU 210 of FIGS. 2A to 2C, and/or a signal receiver 130 (e.g., a first signal receiver 132 connected to the controller 120 of FIG. 1). For example, at least one of the operations of the display device of FIG. 9 may be performed based on instructions stored in the MCU 210 of the controller 120 of FIGS. 2A to 2C. At least one of the operations of FIG. 9 may correspond to at least one of the operations of FIG. 8.

Referring to FIG. 9, in operation 910, according to an embodiment, the display device may control the signal receiver based on a first state of receiving power for a time less than a length of a frame in each of frames. The first state may be related to a stand-by state of the display device. For example, the display device may perform the operation 910 based on operation 810 of FIG. 8. In the first state of the operation 910, the signal receiver may be activated for a period less than the frame in the frame.

Referring to FIG. 9, in operation 920, according to an embodiment, the display device may identify whether at least some of the control signal has been received from a remote controller (e.g., an external electronic device 150 of FIG. 1) in the kth frame. In FIG. 9 and a description of FIG. 9, the k may be a parameter for indicating a relative order in a time domain of the frame. For example, in the kth frame, the display device may identify at least a part of the control signal received from the remote controller, based on the temporarily activated signal receiver based on the operation 910. In case that no control signal is received in the kth frame (920—No), the display device may repeatedly perform the operations 910 and 920 in another frame after the kth frame.

In the kth frame, in response to receiving a part of the control signal from the remote controller (920—Yes), in operation 930, according to an embodiment, the display device may receive the control signal from the remote controller, during a second time section corresponding to a length of the k+1th frame, in the k+1th frame concatenated to the kth frame. According to an embodiment, the display device may perform the operation 930 based on operation 830 of FIG. 8. For example, as the signal receiver of the display device is activated during the k+1th frame, the display device may obtain the control signal transmitted from the remote controller in the k+1th frame by using the signal receiver.

Referring to FIG. 9, in operation 940, according to an embodiment, the display device may determine whether data indicating that a user input to a preset button of the remote controller is identified is included, in the control signal received in the k+1th frame. For example, the preset button may be a power button (e.g., a button 152 of FIG. 1). For example, in response to receiving the user input, the remote controller may repeatedly transmit the control signal in at least two frames (e.g., the kth frame, and the k+1th frame of FIG. 9). In case that the data is not included in the control signal received in the k+1th frame (940—No), according to an embodiment, the display device may perform the operations 910 and 920 in another frame after the k+1th frame.

In case that the data is included in the control signal received in the k+1th frame (940—Yes), in operation 950, according to an embodiment, the display device may initiate provision of power based on the power supplier of the display device. For example, the controller of the display device may cause the power supplier to provide the power to load circuitry (e.g., load circuitry 140 of FIG. 1) of the display device, by controlling the power supplier (e.g., a power supplier 110 of FIG. 1). As the provision of the power based on the power supplier is initiated, after the operation 950, the display device may operate based on an active state.

Referring to FIG. 9, in operation 960, according to an embodiment, the display device may control the signal receiver based on a second state of receiving the power during the length of the frame in each of the frames. The second state may be related to the active state of the display device. For example, the display device may perform the operation 960 based on operation 830 of FIG. 8. In the second state of the operation 960, signal receiver may be activated for a period consistent with the length of the frame, in the frame.

Figure 10:
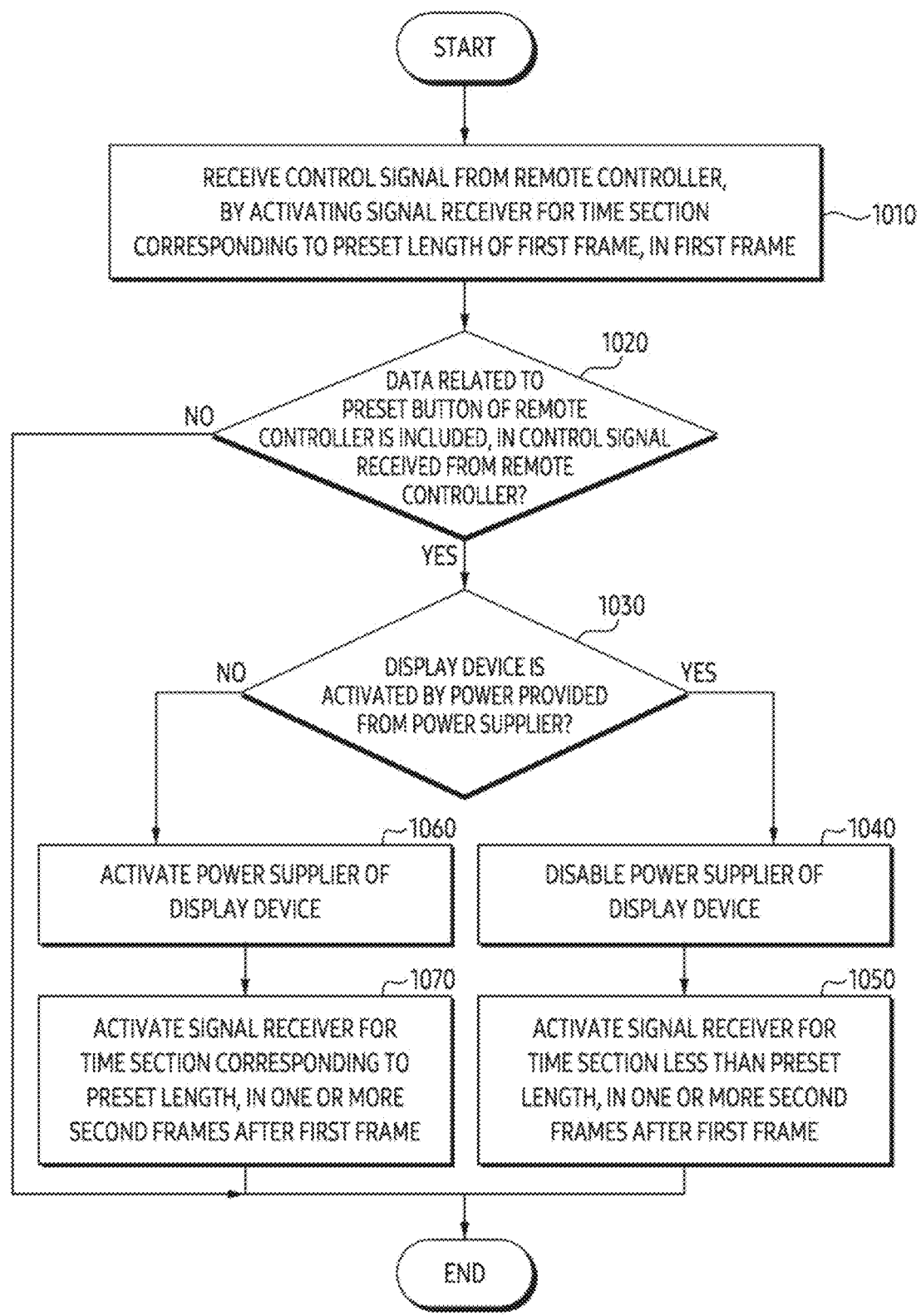
FIG. 10 is a flowchart for illustrating still another example of an operation of a display device, according to an embodiment.

FIG. 10 is a flowchart for illustrating still another example of an operation of a display device, according to an embodiment. The display device of FIG. 10 may be an example of a display device 101 of FIG. 1. An operation of the display device of FIG. 10 may be performed, for example, by a controller 120 of FIG. 1, a MCU 210 of FIGS. 2A to 2C, and/or a signal receiver 130 (e.g., a first signal receiver 132 connected to the controller 120 of FIG. 1). For example, at least one of the operations of the display device of FIG. 10 may be performed based on instructions stored in the MCU 210 of the controller 120 of FIGS. 2A to 2C. The operation of FIG. 10 may be related to operation 930 in the k+1th frame of FIG. 9 and/or operation 820 of FIG. 8.

Referring to FIG. 10, in operation 1010, according to an embodiment, the display device may receive a control signal from the remote controller, by activating the signal receiver for a time section corresponding to a preset length of a first frame, in the first frame. The first frame of FIG. 10 may be a time section 544 of FIGS. 5 to 6, and/or a time section 743 of FIG. 7. For example, the controller of the display device may obtain data included in the control signal transmitted from the remote controller, by continuously activating the signal receiver during the first frame.

Referring to FIG. 10, in operation 1020, according to an embodiment, the display device may determine whether data indicating that a user input to a preset button of the remote controller is identified is included, in the control signal received from the remote controller. In case that the data is not included (1020—No), the display device may control the signal receiver based on a state in which the signal receiver is controlled before the first frame. In case that the data is included (1020—Yes), in operation 1030, according to an embodiment, the display device may determine whether the display device is activated by power provided from the power supplier.

In case that the display device is activated (1030—Yes), in operation 1040, according to an embodiment, the display device may disable the power supplier of the display device. For example, in case that the display device is in an active state, the controller of the display device may switch a state of the display device from the active state to an inactive state. In operation 1050, according to an embodiment, the display device may activate the signal receiver for a time section less than the preset length, in one or more second frames after the first frame. For example, the display device may perform the operation 1050 based on operation 910 of FIG. 9 and/or operation 810 of FIG. 8.

In case that the display device is disabled (1030—No), in operation 1060, according to an embodiment, the display device may activate the power supplier of the display device. For example, in case that the display device is in a stand-by state, the controller of the display device may switch the state of the display device from the inactive state to the active state. In operation 1070, according to an embodiment, the display device may activate the signal receiver for the time section corresponding to the preset length, in one or more second frames after the first frame. For example, the display device may perform the operation 1070 based on operation 960 of FIG. 9 and/or operation 830 of FIG. 8.

As described above, according to an embodiment, the display device may reduce power consumption of the signal receiver based on the operation 1050 in the stand-by state. The display device may support receiving a control signal (e.g., the control signal transmitted from the remote controller) that used the signal receiver, based on temporary activation of the signal receiver, while reducing the power consumption of the signal receiver.

As described above, according to an embodiment, a display device may comprise a signal receiver for receiving a control signal in form of infrared light, from a remote controller different from the display device. The display device may comprise a controller for controlling the signal receiver, based on the control signal received by the signal receiver. The controller of the display device may control the signal receiver, based on a first state in which the signal receiver is activated according to a preset period smaller than a duration of the control signal. The controller of the display device, in response to identifying the control signal by the signal receiver that is controlled based on the first state, may control the signal receiver, based on a second state in which the signal receiver is activated during a time section longer than the duration of the control signal. The controller of the display device may control the display device, based on the control signal identified by the signal receiver.

For example, the display device may further comprise a power supplier. The controller of the display device may comprise a switch for controlling a flow of a current between the signal receiver and a node of the power supplier. The switch, which is controlled based on the first state, may electrically connect the signal receiver and the node in first time sections which are repeated according to the preset period. The switch, which is controlled based on the first state, may electrically disconnect the signal receiver and the node in one or more second time sections between the first time sections.

For example, the node of the power supplier, which is electrically connected to the signal receiver by the switch in the first time sections, may be a ground node.

For example, the node of the power supplier may be a node where a first voltage for driving the signal receiver is applied. The controller may further comprise a driver for transmitting a second voltage higher than the first voltage to the switch in the first time sections.

For example, the switch may maintain, while being controlled based on the second state, an electric connection between the signal receiver and the node independent of the preset period.

For example, the controller, based on identifying the control signal during a first time section in which the signal receiver is controlled based on the first state, may control the signal receiver based on the second state in a second time section concatenated with the first time section in a time domain. The controller may switch a state of the display device to an activated state based on a control signal received from the remote controller in the second time section.

For example, the controller may deactivate the signal receiver at least temporary in a third time section after the second time section in the time domain.

For example, the display device may further comprise a power supplier. The display device may further comprise a displaying panel that is activated by the power supplier. The display device may further comprise a processor, that is activated by the power supplier, for obtaining an image to be displayed in the displaying panel. The controller, in response to identifying the control signal, may cause the power supplier to provide power to at least one of the displaying panel, or the processor, by activating the power supplier.

For example, the controller, in response to identifying the control signal by the signal receiver that is controlled based on the second state after activating the power supplier, may switch a state to control the signal receiver from the second state to the first state.

For example, the signal receiver may be a first signal receiver. The display device may further comprise a displaying panel that is activated by power provided from the activated power supplier. The display device may further comprise a processor for obtaining an image to be displayed in the displaying panel based on power provided from the activated power supplier. The display device may further comprise a second signal receiver for receiving another control signal to control the processor from the remote controller.

As described above, according to an embodiment, a method of a display device may comprise controlling a signal receiver for receiving a control signal in form of infrared light from a remote controller, based on a first state in which the signal receiver is activated according to a preset period smaller than a duration of the control signal. The method of the display device, in response to identifying the control signal by the signal receiver that is controlled based on the first state, may comprise controlling, based on a second state in which the signal receiver is activated during a time section longer than the duration of the control signal. The method of the display device may comprise controlling the display device, based on the control signal identified by the signal receiver.

For example, the controlling the signal receiver based on the first state may comprise electrically connecting the signal receiver and a node of a power supplier of the display device in first time sections which are repeated according to the preset period, by using a switch of the display device. The controlling the signal receiver based on the first state may comprise electrically disconnecting the signal receiver and the node in one or more second time sections between the first time sections, by using the switch.

For example, the controlling the signal receiver based on the second state may comprise maintaining an electric connection between the signal receiver and the node of the power supplier independent of the preset period, by using the switch.

For example, the controlling the display device may further comprise, in response to identifying the control signal, causing the power supplier to provide power to at least one of a displaying panel of the display device, or a processor of the display device for obtaining an image to be displayed in the displaying panel.

For example, the method of the display device may further comprise, in response to identifying the control signal by the signal receiver that is controlled based on the second state after providing the power, switching a state to control the signal receiver from the second state to the first state.

For example, the method of the display device may comprise, after activating the power supplier of the display device based on the control signal, receiving another control signal for controlling the display device from the remote controller by another signal receiver different from the signal receiver in the display device. The method of the display device may comprise, in response to receiving the other control signal by the other control signal receiver, controlling the display device based on the received other control signal.

As described above, according to an embodiment, a display device may comprise a displaying panel. The display device may comprise a power supplier for providing power to the displaying panel. The display device may comprise a signal receiver for receiving a control signal in form of infrared light, for controlling the power supplier. The display device may comprise a controller for controlling the power supplier based on the control signal received by the signal receiver. The controller of the display device may activate the signal receiver during a first time section less than a duration of the control signal. The controller of the display device may receive the control signal for controlling the power supplier based on the signal receiver activated during the first time section. The controller of the display device may activate the signal receiver during a second time section exceeding the first time section in a first state that received at least a part of the control signal during the first time section. The controller of the display device may disable the signal receiver based on expiration of the first time section in the second state different from the first state.

For example, the display device may comprise a switch for electrically connecting at least one of a first node to which a direct current voltage is applied from the power supplier and a grounded second node to the signal receiver. The controller of the display device may activate the signal receiver, by forming a closed-circuit in the signal receiver by controlling the switch during the first time section. The controller of the display device may disable the signal receiver, by forming an opened-circuit in the signal receiver, by controlling the switch during the second time section in the second state.

For example, the controller of the display device may receive the control signal by continuously activating the signal receiver in the second time section, in the first state. The controller of the display device may initiate transmitting the power from the power supplier to the displaying panel, by controlling the power supplier, in response to identifying that the control signal received in the second time section is a preset control signal for controlling the power supplier.

For example, the controller of the display device may discretely activate the signal receiver less than a length of the frame before receiving the control signal.

As described above, according to an embodiment, a method of a display device may comprise activating the signal receiver of the display device during a first time section less than a duration of the control signal of the display device. The method of the display device may comprise receiving the control signal for controlling the power supplier of the display device based on the signal receiver activated during the first time section. The method of the display device may comprise activating the signal receiver during a second time section exceeding the first time section in the frame, in a first state that received at least a part of the control signal during the first time section. The method of the display device may comprise disabling the signal receiver based on expiration of the first time section in the second state different from the first state.

The device described above may be implemented with a hardware component, a software component, and/or a combination of the hardware component and the software component. For example, the device and the component described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a CD-ROM and DVD, magneto-optical medium, such as a floptical disk, and ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, other implementations, other embodiments, and those equivalent to the scope of the claims are also in the scope of the claims described later.

What is claimed is:

1. A display device comprising:
   a signal receiver configured to receive a control signal in form of infrared light, from a remote controller; and
   a controller configured to:
      control the signal receiver, based on the control signal received by the signal receiver,
      control the signal receiver, based on a first state in which the signal receiver is activated according to a preset period smaller than a duration of the control signal;
      in response to identifying the control signal by the signal receiver that is controlled based on the first state, control the signal receiver, based on a second state in which the signal receiver is activated during a time section longer than the duration of the control signal; and
      control the display device, based on the control signal identified by the signal receiver.

2. The display device of claim 1, further comprising a power supplier;
   wherein the controller comprises a switch configured to control a flow of a current between the signal receiver and a node of the power supplier; and
   wherein the switch, which is controlled based on the first state, is configured to:
      electrically connect the signal receiver and the node in first time sections which are repeated according to the preset period, and
      electrically disconnect the signal receiver and the node in one or more second time sections between the first time sections.

3. The display device of claim 2, wherein the node of the power supplier, which is electrically connected to the signal receiver by the switch in the first time sections, is a ground node.

4. The display device of claim 3, wherein the node of the power supplier is a node where a first voltage for driving the signal receiver is applied, and wherein the controller further comprises a driver configured to transmit a second voltage higher than the first voltage to the switch in the first time sections.

5. The display device of claim 4, wherein the switch is configured to maintain, while being controlled based on the second state, an electric connection between the signal receiver and the node independent of the preset period.

6. The display device of claim 1, wherein the controller is further configured to:
based on identifying the control signal during a first time section in which the signal receiver is controlled based on the first state, control the signal receiver based on the second state in a second time section concatenated with the first time section in a time domain,
switch a state of the display device to an activated state, based on a control signal received from the remote controller in the second time section.

7. The display device of claim 6, wherein the controller is further configured to deactivate the signal receiver at least temporarily in a third time section after the second time section in the time domain.

8. The display device of claim 1, further comprises:
a power supplier;
a display device configured to be activated by the power supplier; and
a processor configured to be activated by the power supplier and configured to be obtain an image to be displayed in the display device,
wherein the controller is further configured to, in response to identifying the control signal, cause the power supplier to provide power to at least one of the display device or the processor, by activating the power supplier.

9. The display device of claim 8, wherein the controller is further configured to, in response to identifying the control signal by the signal receiver that is controlled based on the second state after activating the power supplier, switch a state to control the signal receiver from the second state to the first state.

10. The display device of claim 9, wherein the signal receiver is a first signal receiver, and
wherein the display device further comprises:
a display device configured to be activated by power provided from the activated power supplier, and
a second processor configured to obtain an image to be displayed in the display device based on power provided from the activated power supplier, and
a second signal receiver configured to receive another control signal to control the second processor from the remote controller.

11. A method of a display device comprising:
controlling a signal receiver configured to receive a control signal in form of infrared light from a remote controller, based on a first state in which the signal receiver is activated according to a preset period smaller than a duration of the control signal;
in response to identifying the control signal by the signal receiver that is controlled based on the first state, controlling, based on a second state in which the signal receiver is activated during a time section longer than the duration of the control signal; and
controlling the display device, based on the control signal identified by the signal receiver.

12. The method of claim 11, wherein the controlling the signal receiver based on the first state comprises:
electrically connecting the signal receiver and a node of a power supplier of the display device in first time sections which are repeated according to the preset period, by using a switch of the display device, and
electrically disconnecting the signal receiver and the node in one or more second time sections between the first time sections, by using the switch.

13. The method of claim 12, wherein the controlling the signal receiver based on the second state comprises maintaining an electric connection between the signal receiver and the node of the power supplier independent of the preset period, by using the switch.

14. The method of claim 13, wherein the controlling the display device further comprises, in response to identifying the control signal, causing the power supplier to provide power to at least one of a display panel of the display device or a processor of the display device for obtaining an image to be displayed in the display device.

15. The method of claim 14, further comprising, in response to identifying the control signal by the signal receiver that is controlled based on the second state after providing the power, switching a state to control the signal receiver from the second state to the first state.

16. The method of claim 11, further comprising,
after activating the power supplier of the display device based on the control signal, receiving another control signal for controlling the display device from the remote controller by another signal receiver different from the signal receiver in the display device; and
in response to receiving the other control signal by the other control signal receiver, controlling the display device based on the received other control signal.

17. A display device comprising:
a displaying panel;
a power supplier for providing power to the displaying panel;
a signal receiver for receiving a control signal in form of infrared light, for controlling the power supplier; and
a controller for controlling the power supplier based on the control signal received by the signal receiver,
wherein the controller is configured to:
activate the signal receiver during a first time section less than a duration of the control signal;
receive the control signal for controlling the power supplier based on the signal receiver activated during the first time section;
activate the signal receiver during a second time section exceeding the first time section in a first state that received at least a part of the control signal during the first time section; and
disable the signal receiver based on expiration of the first time section in the second state different from the first state.

18. The display device of claim 17, further comprise a switch for electrically connecting at least one of a first node to which a direct current voltage is applied from the power supplier and a grounded second node to the signal receiver,
wherein the controller further configured to:
activate the signal receiver, by forming a closed-circuit in the signal receiver by controlling the switch during the first time section;
disable the signal receiver, by forming an opened-circuit in the signal receiver, by controlling the switch during the second time section in the second state.

19. The display device of claim 17, wherein the controller configured to:
receive the control signal by continuously activating the signal receiver in the second time section, in the first state;

initiate transmitting the power from the power supplier to the displaying panel, by controlling the power supplier, in response to identifying that the control signal received in the second time section is a preset control signal for controlling the power supplier.

20. The display device of claim 17, wherein the controller configured to:
discretely activate the signal receiver less than a length of the frame before receiving the control signal.

* * * * *